(12) United States Patent
Shiga

(10) Patent No.: US 7,571,872 B2
(45) Date of Patent: Aug. 11, 2009

(54) TAPE REEL, RECORDING TAPE CARTRIDGE, TAKE-UP REEL, DRAWING-OUT MEMBER, AND DRIVE DEVICE

(75) Inventor: Hideaki Shiga, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/108,984

(22) Filed: Apr. 24, 2008

(65) Prior Publication Data
US 2008/0265077 A1 Oct. 30, 2008

(30) Foreign Application Priority Data
Apr. 27, 2007 (JP) .............................. 2007-119573

(51) Int. Cl.
G11B 23/107 (2006.01)
(52) U.S. Cl. .................................... 242/348; 242/608.8
(58) Field of Classification Search ............. 242/332.4, 242/348, 348.2, 613.1, 613.4, 609.4, 608.6, 242/608.8
See application file for complete search history.

(56) References Cited

U.S. PATENT DOCUMENTS

| | | | |
|---|---|---|---|
| 3,389,872 A * | 6/1968 | Lyman | 242/608.8 |
| 4,752,046 A * | 6/1988 | Wulfing | 242/348 |
| 4,754,878 A * | 7/1988 | Bose | |
| 6,257,519 B1* | 7/2001 | Willems et al. | 242/608.6 |
| 6,913,219 B2* | 7/2005 | Hiraguchi et al. | 242/348 |
| 7,300,016 B2* | 11/2007 | Brown et al. | 242/613.4 |
| 7,347,397 B2* | 3/2008 | Ishikawa et al. | 242/613.4 |
| 2003/0098386 A1* | 5/2003 | Hashimoto | 242/613.1 |
| 2003/0226924 A1* | 12/2003 | Morita | 242/348 |
| 2006/0043227 A1* | 3/2006 | Iino et al. | 242/348 |

FOREIGN PATENT DOCUMENTS

| | | |
|---|---|---|
| JP | 2002-251859 A | 9/2002 |
| JP | 2004-134060 A | 4/2004 |
| JP | 2004-310827 A | 11/2004 |

* cited by examiner

Primary Examiner—William A Rivera
(74) Attorney, Agent, or Firm—Sughrue Mion, PLLC

(57) ABSTRACT

A tape reel including: a substantially circular cylinder shaped hub; flanges provided as separate bodies from the hub at both end portions of the hub; a connecting member connecting together the flanges at the inside of the hub, in a non-contact state with the inner peripheral face of the hub. The recording tape is wound on the hub in such a manner that the side of the recording tape with the smaller radius of tape edge curvature is on the smaller diameter side of the hub. Also disclosed are: a recording tape cartridge housing such a tape reel; a take-up reel provided in a drive device; a drawing-out member, housed in the hub of a take-up reel and on which recording tape drawn-out from a recording tape cartridge is wound; and a drive device with take-up reel and drawing-out member.

19 Claims, 22 Drawing Sheets

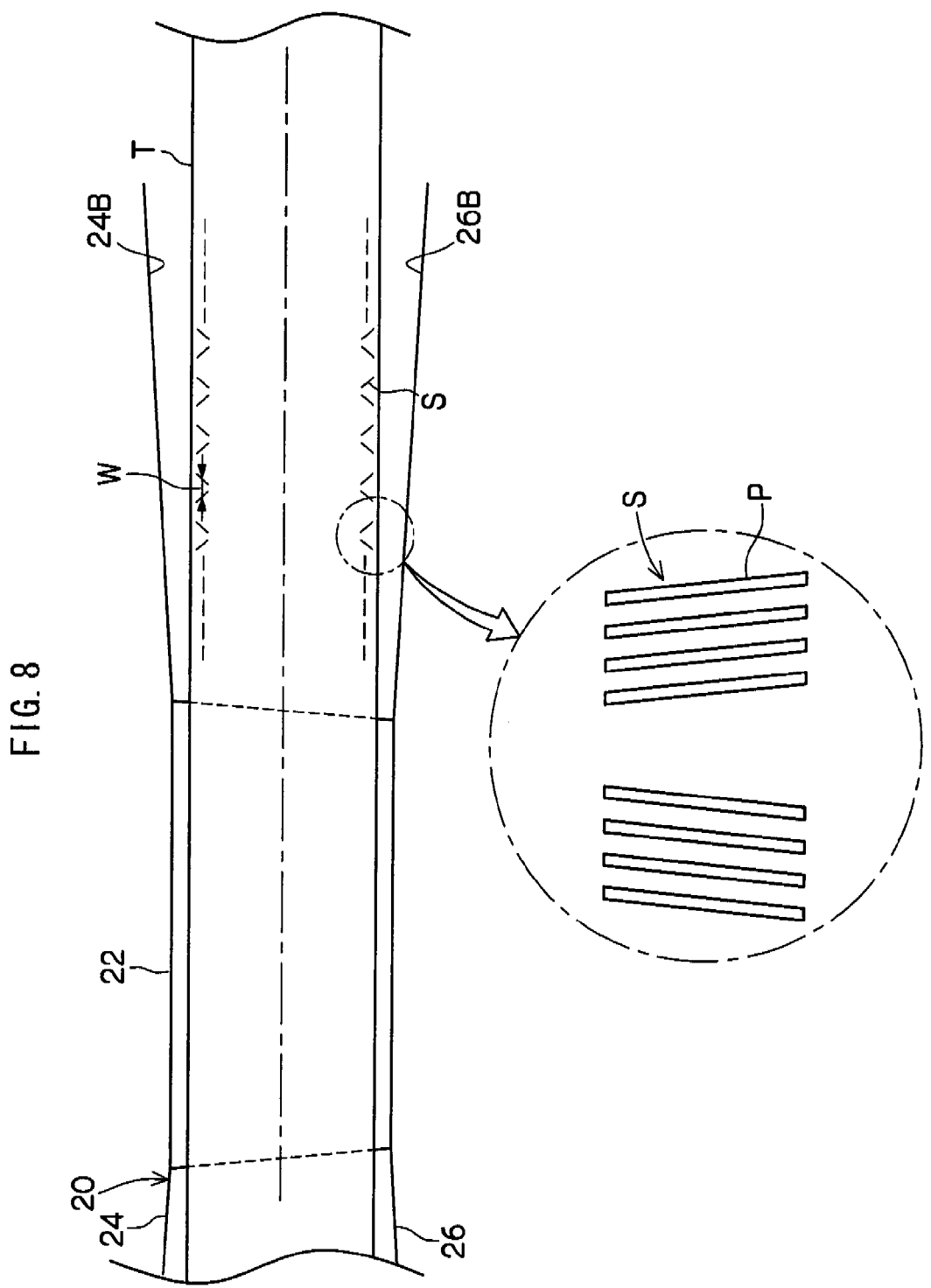

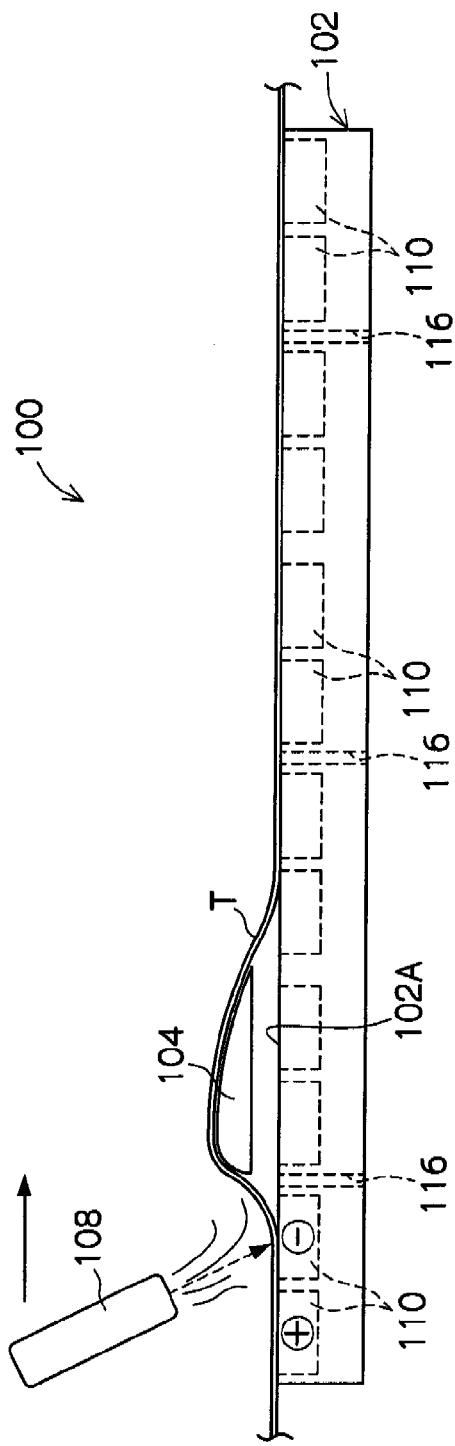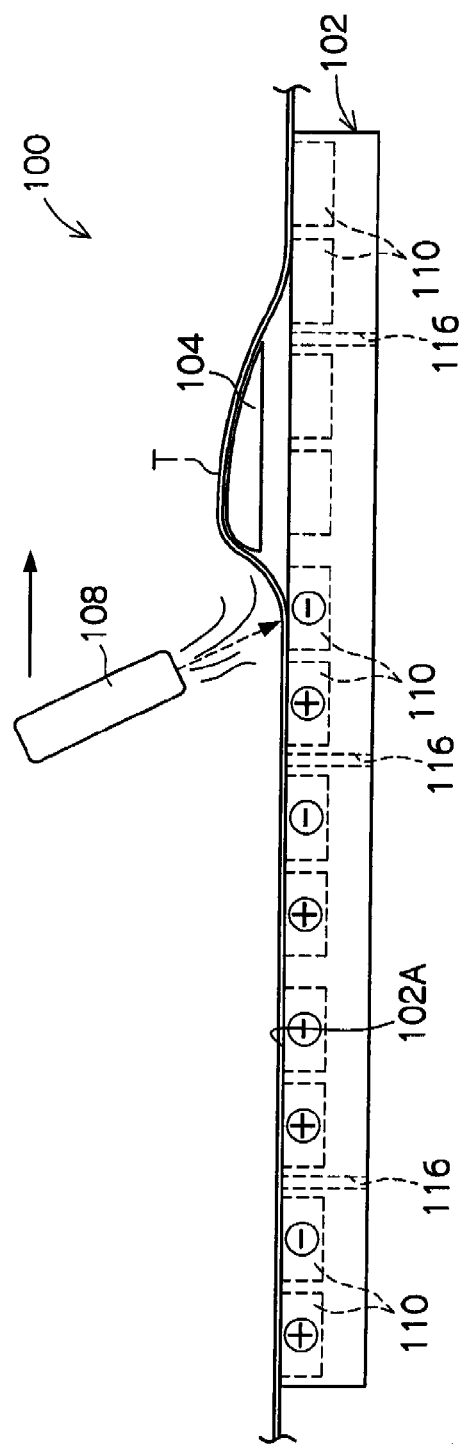

RECORDING TAPE CURVATURE : +0.86mm
REEL HUB UPPER-LOWER RADIAL DIFFERENCE : −0.003mm
REEL HUB MATERIAL POLYCARBONATE : PC (WITH GLASS FIBRE ADDED AT 10%)

RECORDING TAPE CURVATURE : +0.86mm
REEL HUB UPPER-LOWER RADIAL DIFFERENCE : +0.040mm
REEL HUB MATERIAL ALUMINUM : AL

RECORDING TAPE CURVATURE : +0.86mm
REEL HUB UPPER-LOWER RADIAL DIFFERENCE : -0.040mm
REEL HUB MATERIAL ALUMINUM : AL

RECORDING TAPE CURVATURE : −0.15mm
REEL HUB UPPER-LOWER RADIAL DIFFERENCE : −0.040mm
REEL HUB MATERIAL ALUMINUM : AL

TAPE REEL, RECORDING TAPE CARTRIDGE, TAKE-UP REEL, DRAWING-OUT MEMBER, AND DRIVE DEVICE

CROSS-REFERENCE TO RELATED APPLICATION

This application claims priority under 35 USC 119 from Japanese Patent Application No. 2007-119573 filed Apr. 27, 2007, the disclosure of which is incorporated by reference herein.

BACKGROUND OF THE INVENTION

1. Technical Field

The present invention relates to: a tape reel and a take-up reel, for winding recording tape thereon, such as magnetic tape, which is mainly used as a computer recording and reproduction medium; a recording tape cartridge with tape reel stored within a case; a drawing-out member for pulling out recording tape from a tape reel within a case; and a drive device for mounting a recording tape cartridge.

2. Related Art

Conventionally, recording tape cartridges are known for winding recording tape, such as magnetic tape, used as a data recording/reproducing medium for computers and the like, onto a single reel stored in a case. These recording tape cartridges are, for example, mounted in a drive device, and the recording tape is pulled out from an opening provided in the recording tape cartridge with a leader member. This pulled out recording tape passes between tape guides and a recording/reproduction head, and is taken up on a take-up reel disposed on the opposite side to that of the recording tape cartridge.

In particular, a method that has become prevalent is a method for recording/reproducing systems (drive devices) using recording tape cartridges with the recent increases in recording density, in which a recording/reproducing head is moved in the up-down direction by an actuator according to a servo signal that has been recorded on the recording tape in advance, the recording/reproducing head is caused to follow the servo signal, and a data signal is recorded/reproduced. The pulled out recording tape is thereby supported by plural tape guides within the drive device, and control, such that recording tape always runs past a predetermined position of the recording/reproducing head, is desired.

However, in reality, the running recording tape varies in the axial direction (up-down direction) of a hub (winding center) even though supported by the tape guides, and phenomena occur such as distorted winding of the wound recording tape, and one-layer sticking out, in which one rotation of recording tape sticks out from the winding surface. In FIG. 22, distorted winding states are illustrated of one-layer sticking out and of steps (it should be noted that, since the winding surface of the recording tape top tape edge is shown, one-layer sticking out or the like from the recording tape winding surface appears as peaks toward the recording tape bottom tape edge side).

For such distorted winding, the recording/reproducing head, moving in the up-down direction on the basis of the servo signal, which has been recorded in advance to the recording tape, is unable to follow the sudden displacements of the recording tape, particularly when fluctuations occur within small intervals of time (at high speed), and it becomes impossible to carry out the desired data signal recording/reproducing.

Furthermore, as servo tracking control improve, the allowable amount of fluctuation in the recording tape width direction, particularly for high frequency fluctuations (fluctuations within short time intervals), also decreases when running within the drive device. Namely, in a high recording density recording/reproducing system, the size of the recording signal is becoming finer, recording density is increasing, the size of the servo signal is decreasing, the recording density of the servo signal itself is increasing, servo tracking control methods are controlling at high frequencies, recording tape running speeds are increasing, and fluctuations in the recording tape of a level which previously would not have been a problem are now generating recording/reproducing errors of the data signal due to read errors of the servo signal.

A hub provided with a taper angle of 0.01 degrees to 0.1 degrees has been disclosed, with the hub using the larger external diameter side as the recording tape running base (in this case the upper side of the hub), and the recording tape running along the internal face of the upper flange (see, for example, Japanese Patent Application Laid-Open (JP-A) No. 2004-134060). That is, JP-A No. 2004-134060 discloses that when the hub is tapered, the recording tape is wound against the side of the hub with the larger external diameter.

However, often the recording tape adopts a curvature (width direction curvature), and such curvature of the recording tape has an effect on the winding position on the hub, with this effect often being greater than the effect due to tapering of the hub. Therefore, when rewinding the recording tape on the hub described in JP-A No. 2004-134060, there is a chance that the recording tape is wound along the inside face of the lower flange, depending on the direction of recording tape curvature.

Namely, even though the recording tape running base is the upper flange side, there is a chance that the recording tape runs along the lower flange side. Moreover, when the amount of recording tape curvature is large, sometimes the recording tape deviates too much toward one of the flanges and the tape edge is pressed hard against the flange, damaging the tape edge. This particularly becomes a significant problem as the recording tape gets thinner. Furthermore, sometimes if the recording tape is pressed too hard by one of the flanges, the reaction to such pressing leads to the occurrence of one-layer sticking out.

There is also a proposal for preventing recording tape winding distortion due to deformation of the hub as the tightening force (winding tension) of the recording tape against the hub increases, and the consequent gradual decrease in the upper and lower flange separation accompanying such distortion (see, for example, JP-A No. 2002-251859). However, the gradual decrease in the upper and lower flange separation due to hub distortion depends on the rigidity of the hub. JP-A No. 2002-251859 also does not refer to a hub formed with a taper.

There is also a proposal disclosed to neaten (to improve winding straightness) the winding shape (winding surface) by forming a reel in which the diameter of the outer peripheral face of the hub gets smaller at one end than at the other end, as winding of the recording tape progresses (see, for example, JP-A No. 2004-310827). In this proposal, the amount of taper of the hub increases as the winding amount of the recording tape on the hub increases. However, there is normally variation in the curvature direction and amount of curvature of recording tapes, and the running position of the recording tape relative to the hub moves, changing the winding shape (winding surface) on the hub. Due to this, such a reel may, however, actually worsen the recording tape winding straightness, and/or contribute to tape edge damage.

SUMMARY OF THE INVENTION

In consideration of the above circumstances, the present invention provides a tape reel that, when a recording tape is wound on a hub: enables suppression of displacement in the hub axial direction of the recording tape; enables suppression of one-layer sticking out and distortion of the wound recording tape; enables a reduction in the occurrence of problems due to tape edge folding over and tape edge damage due to recording tape of one-layer that is sticking out contacting a flange when impacted, such as when dropped; and also enables a reduction in read error of a servo signal and recording/reproducing error of a data signal. A recording tape cartridge, take-up reel, drawing-out member, and drive device of the same are also provided.

Means by Which the Problem(s) is Solved

A first aspect of the present invention provides a tape reel including: a substantially circular cylinder shaped hub for winding recording tape thereon; flanges, formed as separate bodies from the hub and provided at both end portions of the hub; a connecting member, provided to at least one of the flanges and connecting together the flanges at the inside of the hub, in a non-contact state with the inner peripheral face of the hub; wherein the radius of the outer peripheral face of the hub is different at one end from at the other end, and the recording tape is wound on the hub in such a manner that the side of the recording tape with the smaller radius of tape edge curvature is on the smaller diameter side of the hub.

A second aspect of the present invention is the tape reel according to the first aspect, wherein at least one of the flanges is formed with engaging portions, and the hub includes engaged portions which are engaged by the engaging portions formed on the flange, such that the hub is not relatively rotatable with respect to the flange and such that there is a predetermined gap formed in the hub radial direction between the engaging portions and the engaged portions.

The tape reel of the first and second aspects of the present invention is provided with a hub having a radial difference between the two ends thereof, and the hub is in an independent state with respect to the flanges. Namely, the configuration is such that deformation of the hub does not move/influence the flanges, or vice-versa. With a tape reel configured in such a manner the following effects (1) and (2) are shown.

(1) When the recording tape is wound on the hub while applied with tension in a direction substantially perpendicular to the axis of the hub, the recording tape is wound while deviating toward the flange on the small-diameter side of the hub due to asymmetry of the distribution of the surface pressure acting on the recording tape.

(2) When the recording tape is wound on the hub in such a manner that the side having the smaller radius of tape edge curvature is on the small-diameter side of the hub, the direction of movement of the recording tape is toward the small-diameter side of the hub.

According to the first and second aspects of the present invention, the recording tape may be wound with deviation toward the smaller diameter side of the hub due to the synergy of (1) and (2). Therefore, displacement of the recording tape in the axial direction of the hub (the direction perpendicular to the running direction of the recording tape) may be suppressed, disordered winding of the recording tape T may be suppressed, and the winding neatness (correctness) may be improved.

As a result, occurrence of sticking out of one lap, or plural laps, of the recording tape from the winding face of the tape wound on the hub and occurrence of steps may be suppressed. Also problems during handling caused by drop impacts, when the sticking-out lap of the recording tape contacts with one of the flanges and is folded, and tape edge damage, may be reduced. Moreover, positional displacement of the recording tape in the axial direction of the hub (the direction perpendicular to the running direction of the recording tape) may also be suppressed when the recording tape is running in a drive device and so the tape running position may be stabilized.

Therefore, servo signal read errors and data signal recording/reproducing errors may be reduced, even with high density recording, and a reduction in the occurrence of position error signals and "off-track" may be expected. It should be noted that the meaning of "connected" encompasses connecting together the connecting member with the flange(s), and/or connecting members with each other by welding together, by snap-fitting, and the like. Furthermore, there are at least 3 of the engaging portions and of the engaged portions, provided at substantial even intervals in the circumferential direction, so that there is negligible gap therebetween, in the circumferential direction. The hub and the flanges are thereby disposed coaxially.

A third aspect of the present invention is a tape reel of the first or second aspects, wherein the modulus of elasticity of the hub is 70 GPa or greater.

According to the third aspect of the present invention the winding neatness may be improved even further. In particular, if the modulus of elasticity of the hub is 190 GPa or greater, then an even better winding shape may be obtained.

A fourth aspect of the present invention is the tape reel of any one of the first to third aspects, wherein the ratio of the radial difference, between one end of the hub and the other, to the width of the recording tape is from 0.00039 to 0.00474.

When the radial difference, between one end of the hub and the other, to the width of the recording tape is close to zero (in the case of a substantially circular cylindrical hub), the effect of moving the recording tape for winding to the smaller diameter side of the hub is not obtainable. Furthermore, when the radial difference, between one end of the hub and the other, to the width of the recording tape is too large, the recording tape presses too hard against the face of the flange on the small radius side of the hub, damaging the tape edge, generating so-called radial defects, and the recording tape is impeded by the flange when running, causing further tape edge damage and other defects, such as a cinching phenomenon, may also be generated.

Therefore, in the fourth aspect of the present invention, the ratio of the radial difference, between one end of the hub and the other, to the width of the recording tape is set to a particular value. Specifically, the ratio of the radial difference is set within the range of from 0.00039 to 0.00474. This range functions sufficiently when there is a small curvature amount of the recording tape (such as, for example, 0.5 mm to 2.0 mm). However, from the perspective of the manufacturability and the design freedom of the reel, even when the curvature amount of the recording tape is larger (such as, for example, 2.5 mm) good results may be obtained as long as the ratio of the radial difference, between one end of the hub and the other, to the width of the recording tape within the range of from 0.00055 to 0.00400.

Namely, as long as the ratio of the radial difference, between one end of the hub and the other, to the width of the recording tape is within the range from 0.00055 to 0.00400, even when the radius of tape edge curvature of the recording tape is small (even when the curvature amount is as large as, for example, 2.5 mm) the recording tape is not pressed too hard against the face of the flange on the smaller diameter side of the hub, and the occurrence of running defects, such as damage to the tape edge and abnormal noise, due to the recording tape being impeded by the flange may be suppressed. Details of the measurement method are explained later, but it should be noted that "curvature amount" refers, with a 1.0 m length of recording tape, to the distance between the edge of the tape at the central portion thereof and a reference line connecting the position of the edge of the tape at each end of the 1.0 m length.

A fifth aspect of the present invention is the tape reel of any one of the first to the third aspects, wherein the width of the recording tape is approximately 12.65 mm and the difference between the radius at one end of the hub to at the other end of the hub is 5 μm to 60 μm.

When the radial difference, between one end of the hub and the other, to the width of the recording tape is close to zero (in the case of a substantially circular cylindrical hub), the effect of moving the recording tape for winding to the smaller diameter side of the hub is not obtainable. Furthermore, when the radial difference, between one end of the hub and the other, to the width of the recording tape is too large, the recording tape presses too hard against the face of the flange on the small radius side of the hub, damaging the tape edge, generating so-called radial defects, and the recording tape is impeded by the flange when running, causing further tape edge damage and other defects, such as a cinching phenomenon, may also be generated.

Therefore, in the fifth aspect of the present invention, the width of the recording tape is approximately 12.65 mm and the difference between the radius at one end of the hub to at the other end of the hub is 5 μm to 60 μm. This range functions sufficiently when there is a small curvature amount of the recording tape (such as, for example, 0.5 mm to 2.0 mm). However, from the perspective of the manufacturability and the design freedom of the reel, even when the curvature amount of the recording tape is larger (such as, for example, 2.5 mm) good results may be obtained as long as the radial difference, between one end of the hub and the other, is within the range from 7 μm to 50 μm.

Namely, for a recording tape with a width of about 12.65 mm, as long as the radial difference, between one end of the hub and the other, is within the range from 7 μm to 50 μm, even when the radius of curvature of the tape edge curvature of the recording tape is small (even when the curvature amount is as large as, for example, 2.5 mm) the recording tape is not pressed too hard against the face of the flange on the smaller diameter side of the hub, and the occurrence of running defects, such as damage to the tape edge and abnormal noise, due to the recording tape being impeded by the flange may be suppressed.

A sixth aspect of the present invention is the tape reel of any one of the first to the fifth aspects, wherein the absolute value of an amount of curvature of the recording tape is from 0.15 mm to 2.5 mm.

According to the sixth aspect of the present invention, by making the absolute value of an amount of curvature of the recording tape in the range of from 0.15 mm to 2.5 mm, the recording tape is not pressed too hard against the face of the flange on the smaller diameter side of the hub, and the occurrence of running defects, such as damage to the tape edge and abnormal noise, due to the recording tape being impeded by the flange may be suppressed. Furthermore, normally when the curvature is close to zero, disordered winding readily develops due to fluctuations in the polarity of the curvature value, and the winding surface takes up a so-called dished winding shape, however, by the absolute value of the curvature amount being 0.15 mm or greater, together with a configuration of one of the first to the fifth aspects, disordered winding may be suppressed, and a winding surface that is more correct may be achieved.

Namely, tape edge damage to the recording tape, the generation of radiation defects, impeding of the recording tape when running by the flange on the small radius side, leading to further tape edge damage and the development of defects such as cinching and the like, may be avoided, and appropriately stable tape running position with little disordered winding may be realized.

It should be noted that it is more preferable that the absolute value of the amount of curvature of the recording tape being in the range of from 0.5 mm to 2.0 mm, as the tape edge is then deviated by an appropriate amount toward one of the flanges when the recording tape is wound on the hub. Namely, the positional deviation of the recording tape in the axial direction of the hub when running is decreased, winding disorder may be suppressed, and tape edge damage may also be reduced, since the recording tape is neatly wound along either one of the upper or the lower flanges.

A seventh aspect of the present invention is the tape reel of any one of the first to the sixth aspects, wherein the thickness of the recording tape is 7.5 μm or less.

Furthermore, when the recording tape is thick, the tape edges are increased in strength due to the increase in the rigidity of the recording tape, and tape edge damage, such as due to pressing/impact/friction/abrasion against the flanges, does not readily occur. However, for a recording tape of the same width, if the same tension is applied for a thinner tape, there is a change in the stress distribution applied across the width direction of the tape when it has been wound. Therefore, the invention according to the seventh aspect has a suitable limitation to a suitable thickness of an effective recording tape to apply to the present invention.

An eighth aspect of the present invention is the tape reel of any one of the first to the seventh aspects, wherein the recording tape for winding is recorded with a servo signal, which becomes a reference for positioning of a recording and reproducing head on a drive device side, and for the recording tape wound on the hub, the tape edge on the smaller radius side of the outer peripheral face of the hub is the reference for servo tracking control when the recording tape is running.

According to the eighth aspect of the present invention the tape edge of the recording tape wound on the hub on the flange side to which the recording tape deviates toward, is the same as the tape edge used for servo tracking control when the recording tape is running, and therefore the recording tape running position may be stabilized. Servo tracking errors and data signal recording/reproducing errors may therefore be reduced.

A ninth aspect of the present invention is a recording tape cartridge including the tape reel of any one of the first to the eighth aspects, in which the tape reel is rotatably housed.

According to the ninth aspect of the present invention, substantially the same effects may be obtained as in the first to the eighth aspects. In particular, there is a tendency toward thinner recording tapes in order to increase the recording capacity per tape cartridge, and this leads to a reduction in rigidity of the recording tape, and a decrease in the strength of the tape edges, however, since the frequency with which one lap sticks out from the recording tape winding surface, together with the amount of sticking out, may be decreased, the tape edges are not readily damaged even when using thin recording tape.

A tenth aspect of the present invention is the tape reel of the ninth aspect, wherein a single reel of the tape reel is provided.

According to the tenth aspect of the present invention, in a tape reel, since the winding neatness of a recording tape may be improved, and since also positional displacement in the axial direction of the hub (the direction perpendicular to the running direction of the recording tape) when the recording tape is running may be suppressed, displacement of the recording tape in the axial direction of the hub (the direction perpendicular to the running direction of the recording tape) of the take-up reel on the drive device side, this hub being difficult to improve in precision, may be suppressed by the tape reel on the recording tape cartridge side. Such a configuration is therefore preferably applied to computer data backup applications where a high recording capacity is desired in a single real recording tape cartridge. It should be noted that the reason why it is difficult to manufacture a take-up reel with high precision is that such a reel has the function of accommodating the drawing out member, and therefore the shape thereof is complicated.

An eleventh aspect of the present invention is a take-up reel which is provided in a drive device and around which recording tape drawn out of a recording tape cartridge is wound, the take-up reel including: a cylindrical shaped hub for winding recording tape thereon; flanges, formed as separate bodies from the hub and provided at both end portions of the hub; a connecting member, provided to at least one of the flanges and connecting together the flanges at the inside of the hub, in a non-contact state with the inner peripheral face of the hub; wherein the radius of the outer peripheral face of the hub is different at one end from at the other end, and the recording tape is wound on the hub in such a manner that the side of the recording tape with the smaller radius of tape edge curvature is on the smaller diameter side of the hub.

A twelfth aspect of the present invention is the tape reel according to the eleventh aspect, wherein at least one of the flanges is formed with engaging portions, and the hub includes engaged portions which are engaged by the engaging portions formed on the flange, such that the hub is not relatively rotatable with respect to the flange and such that there is a predetermined gap formed in the hub radial direction between the engaging portions and the engaged portions.

According to the take-up reel of the eleventh and twelfth aspects of the present invention, substantially the same effects may be obtained as with the first and second aspects of the invention. Namely, the configuration is one in which the take-up reel is provided with a hub having a radial difference between the two ends thereof, and the hub is in an independent state with respect to the flanges, and the hub does not move/influence the flanges, or vice-versa. With a take-up reel configured in such a manner the following effects (1) and (2) are shown.

(1) When the recording tape is wound on the hub while applied with tension in a direction substantially perpendicular to the axis of the hub, the recording tape is wound while deviating toward the flange on the small-diameter side of the hub due to asymmetry of the distribution of the surface pressure acting on the recording tape.

(2) When the recording tape is wound on the hub in such a manner that the side having the smaller radius of tape edge curvature is on the small-diameter side of the hub, the direction of movement of the recording tape is toward the small-diameter side of the hub.

According to the eleventh and twelfth aspects of the present invention, the recording tape may be wound with deviation toward the small-diameter side of the hub due to the synergy of (1) and (2). Therefore, positional displacement of the recording tape in the axial direction of the hub (the direction perpendicular to the running direction of the recording tape) may be suppressed when the recording tape is running in the drive device, and the running position of the recording tape may be stabilized. Therefore, disordered winding of the recording tape may be suppressed, the winding correctness may be improved, and the occurrence of sticking out of one lap, or plural laps, of the recording tape from the winding face of the tape wound on the hub and occurrence of steps may be suppressed.

Therefore, servo signal read errors (servo-tracking errors) and data signal recording/reproducing errors may be reduced, even with high density recording, and a reduction in the occurrence of position error signals and off-track may be expected. Also tape edge damage when the recording tape is running, generated by too strong contact with tape guides provided in the drive device and with the take-up reel flanges, as well as with the tape reel flanges, may be avoided. It should be noted that the meaning of "connected" encompasses connecting together the connecting member with the flange(s), and/or connecting members with each other, by welding together, snap-fitting, and the like. Furthermore, there are at least 3 of the engaging portions and of the engaged portions, provided at substantial even intervals so that there is negligible gap therebetween in the circumferential direction. The hub and the flanges are thereby disposed coaxially.

A thirteenth aspect of the present invention is the take-up reel of the eleventh or twelfth aspects wherein the modulus of elasticity of the hub is 70 GPa or greater.

According to the thirteenth aspect of the present invention, in a similar manner to with the third aspect, the winding neatness may be improved even further. In particular, if the modulus of elasticity of the hub is 190 GPa or greater, then the winding shape obtained is even better.

A fourteenth aspect of the present invention is the take-up reel of any one of the eleventh to thirteenth aspects, wherein the ratio of the radial difference, between one end of the hub and the other, to the width of the recording tape is from 0.00039 to 0.00474.

According to the fourteenth aspect of the present invention, substantially the same effects may be obtained as with the fourth aspects of the invention. Namely, when the radial difference, between one end of the hub and the other, to the width of the recording tape is close to zero (in the case of a substantially circular cylindrical hub), the effect of moving the recording tape for winding to the smaller diameter side of the hub is not obtainable.

Furthermore, when the radial difference, between one end of the hub and the other, to the width of the recording tape is too large, the recording tape presses too hard against the face of the flange on the small radius side of the hub, damaging the tape edge, generating so-called radial defects, and the recording tape is impeded by the flange when running, causing further tape edge damage and other defects, such as a cinching phenomenon, may also be generated.

Therefore, in the fourteenth aspect of the present invention, the ratio of the radial difference, between one end of the hub and the other, to the width of the recording tape is set to a particular value. Specifically, the ratio of the radial difference is set to within the range of from 0.00039 to 0.00474. This range functions sufficiently when there is a small curvature amount of the recording tape (such as, for example, 0.5 mm to 2.0 mm). However, from the perspective of the manufacturability and the design freedom of the reel, even when the curvature amount of the recording tape is larger (such as, for example, 2.5 mm) good results may be obtained as long as the ratio of the radial difference, between one end of the hub and the other, to the width of the recording tape is within the range from 0.00055 to 0.00400.

Namely, as long as the ratio of the radial difference, between one end of the hub and the other, to the width of the recording tape is within the range from 0.00055 to 0.00400, even when the radius of curvature of the tape edge curvature of the recording tape is small (even when the curvature amount is as large as, for example, 2.5 mm) the recording tape is not pressed too hard against the face of the flange on the smaller diameter side of the hub, and the occurrence of running defects, such as damage to the tape edge and abnormal noise, due to the recording tape being impeded by the flange may be suppressed. Details of the measurement method are explained later, but it should be noted that "curvature amount" refers, with a 1.0 m length of recording tape, to the distance between the edge of the tape at the central portion thereof and a reference line connecting the position of the edge of the tape at each end of the 1.0 m.

A fifteenth aspect of the present invention is the take-up reel of any one of the eleventh to the thirteenth aspects, wherein the width of the recording tape is approximately 12.65 mm and the difference between the radius at one end of the hub to at the other end of the hub is 5 µm to 60 µm.

According to the fifteenth aspect of the present invention, substantially the same effects may be obtained as with the fifth aspects of the invention. Namely, when the radial difference, between one end of the hub and the other, to the width of the recording tape is close to zero (in the case of a substantially circular cylindrical hub), the effect of moving the recording tape for winding to the smaller diameter side of the hub is not obtainable.

Furthermore, when the radial difference, between one end of the hub and the other, to the width of the recording tape is too large, the recording tape presses too hard against the face of the flange on the small radius side of the hub, damaging the tape edge, generating so-called radial defects, and the recording tape is impeded by the flange when running, causing further tape edge damage and other defects, such as a cinching phenomenon, may also be generated.

Therefore, in the fifteenth aspect of the present invention, the width of the recording tape is approximately 12.65 mm and the difference between the radius at one end of the hub to at the other end of the hub is 5 µm to 60 µm. This range functions sufficiently when there is a small curvature amount of the recording tape (such as, for example, 0.5 mm to 2.0 mm). However, from the perspective of the manufacturability and the design freedom of the reel, even when the curvature amount of the recording tape is larger (such as, for example, 2.5 mm) good results may be obtained as long as the radial difference, between one end of the hub and the other, is within the range from 7 µm to 50 µm.

Namely, for a recording tape with a width of about 12.65 mm, as long as the radial difference, between one end of the hub and the other, is within the range from 7 µm to 50 µm, even when the radius of curvature of the tape edge curvature of the recording tape is small (even when the curvature amount is as large as, for example, 2.5 mm) the recording tape is not pressed too hard against the face of the flange on the smaller diameter side of the hub, and the occurrence of running defects, such as damage to the tape edge and abnormal noise, due to the recording tape being impeded by the flange may be suppressed.

A sixteenth aspect of the present invention is the take-up reel of any one of the eleventh to the fifteenth aspects, wherein the absolute value of an amount of curvature of the recording tape is 0.15 mm to 2.5 mm.

According to the sixteenth aspect of the present invention, in a take-up reel, substantially the same effects may be obtained as with the sixth aspect of the invention. Namely, by making the absolute value of an amount of curvature of the recording tape in the range of from 0.15 mm to 2.5 mm, the recording tape is not pressed too hard against the face of the flange on the smaller diameter side of the hub, and the occurrence of running defects, such as damage to the tape edge and abnormal noise, due to the recording tape being impeded by the flange may be suppressed. Furthermore, normally when the curvature is close to zero, disordered winding readily develops due to fluctuations in the polarity of the curvature value, and the winding surface takes up a so-called dished winding shape, however, by the absolute value of the curvature amount being 0.15 mm or greater, together with a configuration of one of the eleventh to the fifteenth aspects, disordered winding may be suppressed, and a winding surface that is more correct may be achieved.

Namely, tape edge damage to the recording tape, the generation of radiation defects, impeding of the recording tape when running by the flange on the small radius side, leading to the development of defects such as further tape edge damage and cinching and the like, may be avoided, and appropriately stable tape running position with little disordered winding may be realized.

It should be noted that it is more preferable that the absolute value of the amount of curvature of the recording tape being in the range of from 0.5 mm to 2.0 mm, as the tape edge is then deviated by an appropriate amount toward one of the flanges when the recording tape is wound on the hub. Namely, the positional deviation of the recording tape in the axial direction of the hub when running is decreased, and winding disorder may be suppressed, and also tape edge damage may be reduced since the recording tape is neatly wound along either one of the upper or the lower flanges.

A seventeenth aspect of the present invention is the take-up reel of any one of the eleventh to the sixteenth aspects, wherein the thickness of the recording tape is 7.5 µm or less.

According to the seventeenth aspect of the present invention, in a take-up reel, substantially the same effects may be obtained as with the seventh aspect of the invention. Namely, when the recording tape is thick, the tape edges are increased in strength due to the increase in the rigidity of the recording tape, and tape edge damage, such as due to pressing/impact/friction/abrasion against the flanges does not readily occur. However, if the same tension is applied for a recording tape of the same width for a thinner tape, there is a change in the stress distribution applied across the width direction of the tape when it has been wound. Therefore, the invention according to the seventeenth aspect has a suitable limitation to a suitable thickness of an effective recording tape which may be applied to which the present invention.

An eighteenth aspect of the present invention is the take-up reel of any one of the eleventh to the seventeenth aspects, wherein the recording tape for winding is recorded with a servo signal, which becomes a reference for positioning of a recording and reproducing head on a drive device side, and for the recording tape wound on the hub, the tape edge on the smaller radius side of the outer peripheral face of the hub is the reference for servo tracking control when the recording tape is running.

According to the eighteenth aspect of the present invention, in a take-up reel, substantially the same effects may be obtained as with the eighth aspect of the invention. Namely, the tape edge of the recording tape wound on flange side of the hub toward which the tape deviates, is the same as the tape edge used for servo tracking control when the recording tape is running, and therefore the recording tape running position may be stabilized. Servo tracking errors and data signal recording/reproducing errors may therefore be reduced.

A drawing-out member according to a nineteenth aspect of the present invention is for drawing recording tape out of a recording tape cartridge, the drawing-out member being housed in the hub of the tape reel of any one of the eleventh to the eighteenth aspects and including a winding face forming a part of the outer peripheral face of the hub, wherein the radius at one end of the winding face is different from the radius at the other end of the winding face, and the winding face and the outer peripheral face of the hub become substantially flush with each other when the drawing-out member is housed in the hub.

If there is a difference in level (step) created between the winding face of the drawing-out member and the outer peripheral face of the hub, deformation (transmission of the step to layers above) of the recording tape is caused by the difference in level when the recording tape is wound around the hub and the possibility of drop-out error occurring at that portion increases. However, according to the nineteenth aspect of the present invention since the drawing-out member has a winding face forming a part of the outer peripheral face of the hub, with the radius at one end of the winding face different from the radius at the other end of the winding face, the winding face and the outer peripheral face of the hub become substantially flush with each other when the drawing-out member is housed in the hub, such that there is no difference in level around the whole of the outer peripheral face of the hub and such a step is not created. Substantially the same effects as with the eleventh to the eighteenth aspects of the invention may therefore be obtained.

The twentieth aspect of the present invention is a drive device including the take-up reel of any one of the eleventh to the eighteenth aspects, around which recording tape drawn out of a recording tape cartridge housed in the drive device is wound.

According to the twentieth aspect of the present invention, substantially the same effects may be obtained as with the eleventh to the eighteenth aspects of the invention. Namely, positional displacement of the recording tape in the axial direction of the hub may be suppressed when the recording tape is running in the drive device, and the running position of the recording tape may be stabilized. Therefore, servo signal read errors and data signal recording/reproducing errors may be reduced, even with high density recording, and a reduction in the occurrence of position error signals and off-track may be expected.

Also tape edge damage when the recording tape is running, generated by too strong contact with tape guides provided in the drive device and with the take-up reel flanges, as well as with the tape reel flanges, may be avoided. Namely, tape edge damage to the recording tape, the generation of radiation defects, impeding of the recording tape when running by the flange on the small radius side, leading to the development of defects such as further tape edge damage and cinching and the like, may be avoided, and appropriately stable tape running position with little disordered winding may be realized.

A twenty-first aspect of the present invention is the drive device according to the twentieth aspect of the present invention, including the drawing-out member of the nineteenth aspect.

According to the twenty-first aspect of the present invention, substantially the same effects may be obtained as with the nineteenth aspect. Namely, since the drawing-out member has a winding face forming a part of the outer peripheral face of the hub, with the radius at one end of the winding face different from the radius at the other end of the winding face, the winding face and the outer peripheral face of the hub become substantially flush with each other when the drawing-out member is housed in the hub, such that there is no difference in level around the whole of the outer peripheral face of the hub and a step is not created. Therefore, transmission of the step to layers above, which occurs when recording tape has been wound on a hub of a take-up reel with a step, does not readily occur.

BRIEF DESCRIPTION OF THE DRAWINGS

Exemplary embodiments of the present invention will be described in detail based on the following figures, wherein:

FIG. 8 is a schematic side view showing a servo signal of a recording tape;

FIG. 12A is schematic side view for explaining the operation of a tape profile measuring device;

FIG. 12B is schematic side view for explaining the operation of a tape profile measuring device;

DETAILED DESCRIPTION OF THE INVENTION

Figure 1:
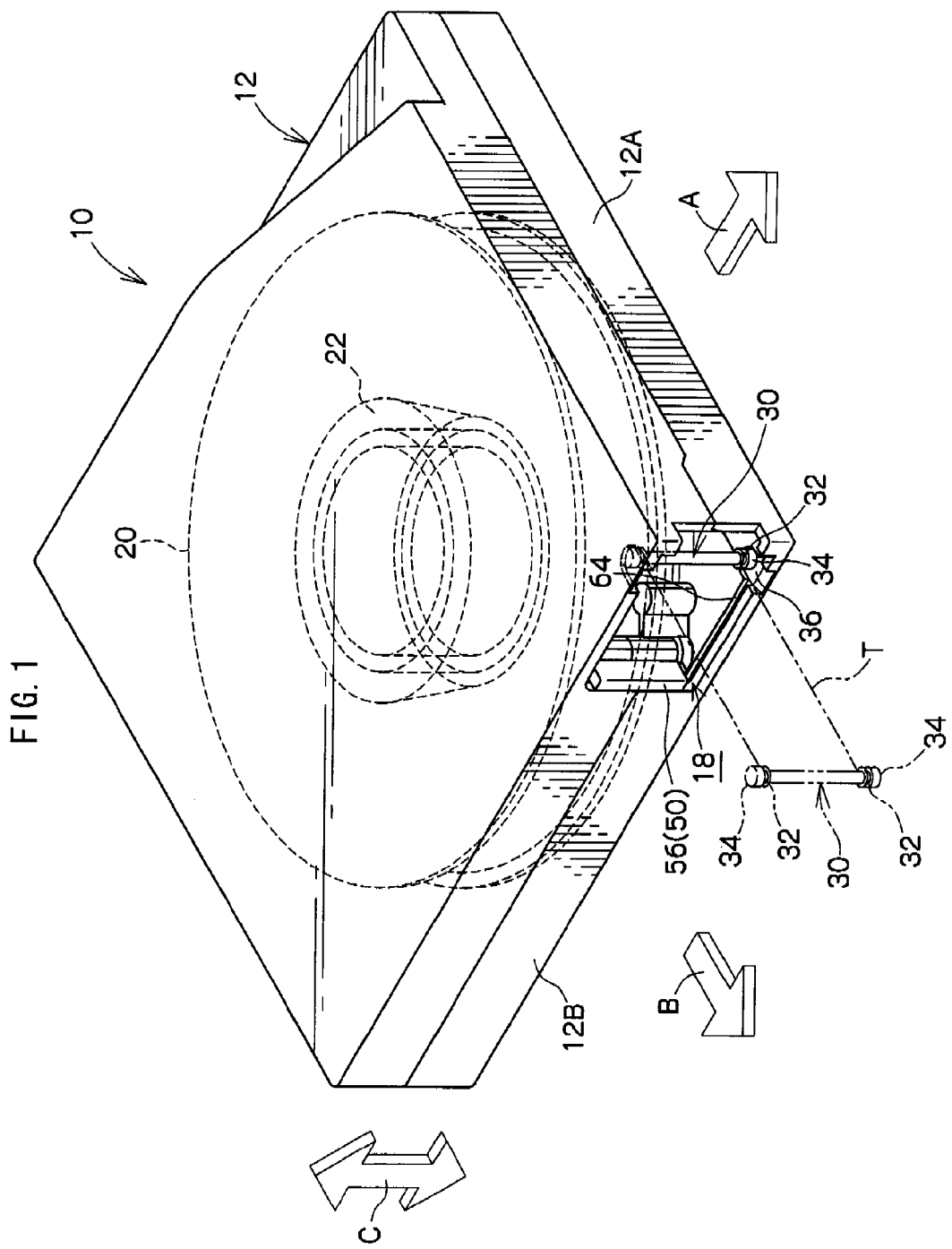
FIG. 1 is a schematic perspective view of a recording tape cartridge according to the present exemplary embodiment.

Explanation will now be given of details of an embodiment of the best mode of the present invention, with reference to an exemplary embodiment shown in the diagrams. It should be noted that, for ease of explanation, in FIG. 1, the direction of loading into a drive device 70 (see FIG. 5) of a recording tape cartridge 10 is shown by the arrow A, and this is designated as the front direction (front side) of the recording tape cartridge 10. Also, the direction orthogonal to the direction of arrow A, shown by the arrow B, is designated as the right direction (right side) of the recording tape cartridge 10. Furthermore, the direction of arrow C is designated as the width direction, and this is the same direction as the up-down direction, and height direction in the present exemplary embodiment, and also the same direction as the axial direction of the reel 20 (reel hub 22), and axial direction of the take-up reel 80 (reel hub 82).

Figure 2:
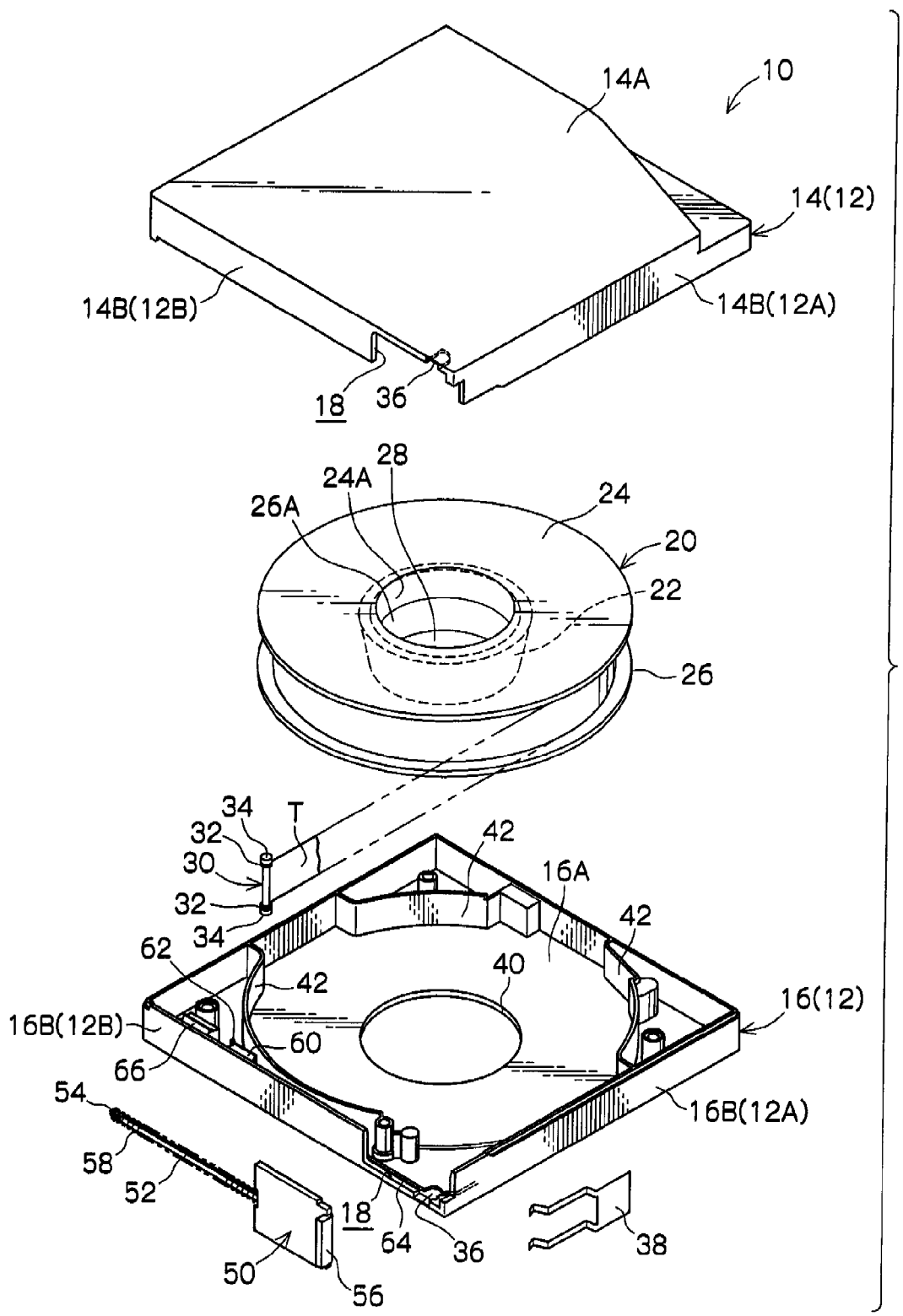
FIG. 2 is an exploded schematic perspective view of a recording tape cartridge according to the present exemplary embodiment.

As shown in FIGS. 1 and 2, the recording tape cartridge 10 has a substantially rectangular box shaped case 12. The case 12 is configured by an upper case 14 and a lower case 16 made from a resin, such as poly carbonate (PC). The upper case 14 and the lower case 16 are configured, respectively, with a top panel 14A having a peripheral wall 14B extending down therefrom, and a bottom panel 16A having a peripheral wall 16B extending up therefrom, and the peripheral walls 14B, 16B are joined together by ultrasonic welding, screws or the like.

A single reel (tape reel) 20 is rotatably accommodated within the case 12. The reel 20 includes: a circular cylindrical shaped reel hub 22, configuring the axial central portion (winding center) of the reel 20; a ring-shaped upper flange 24, disposed at a top end portion of the reel 20; and a circular plate shaped lower flange 26, disposed at a bottom end portion thereof. The reel hub 22 and the upper and lower flanges 24, 26 are formed as separate bodies so as to be independent of one another.

Figure 3:
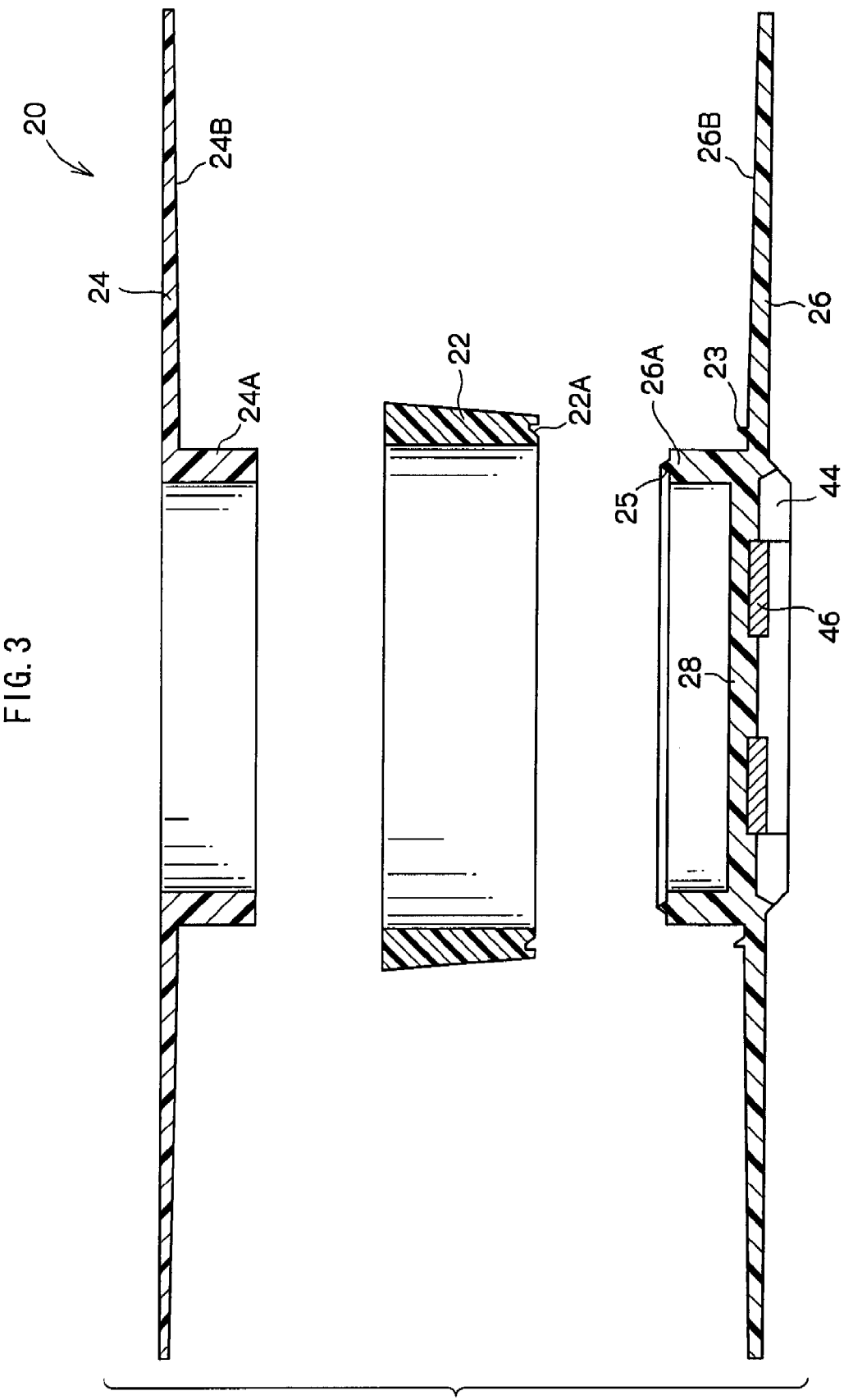
FIG. 3 is an exploded schematic cross-section of a reel according to the present exemplary embodiment.
Figure 4:
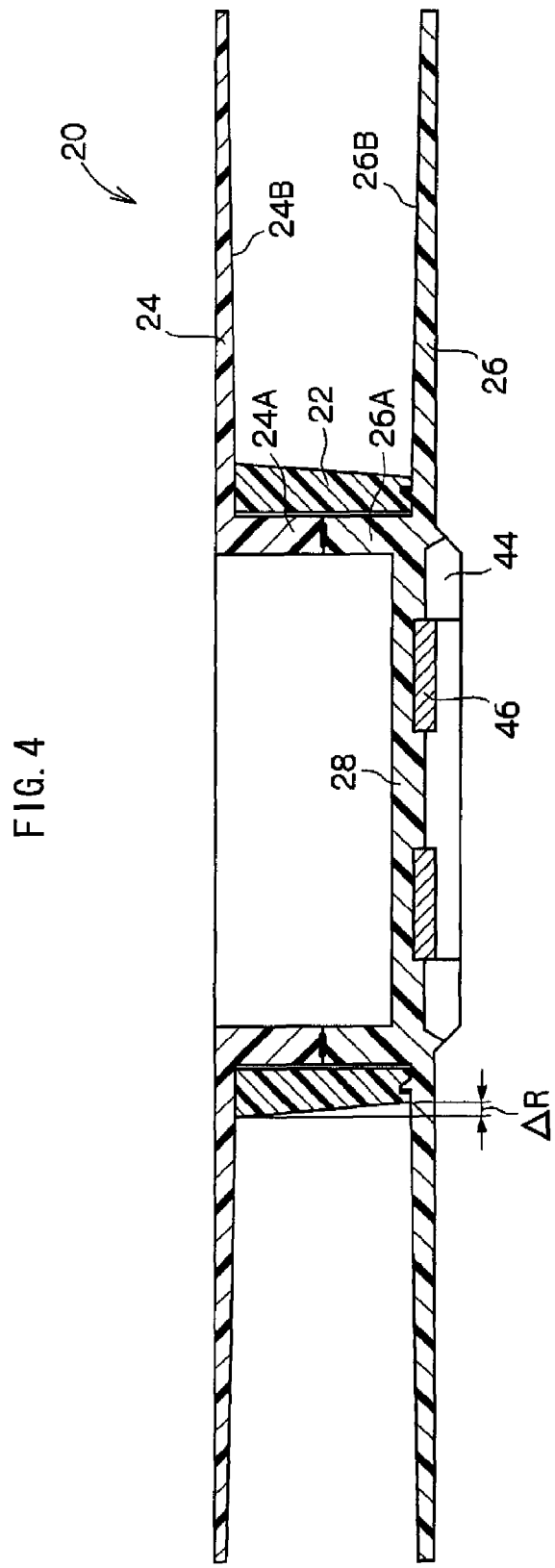
FIG. 4 is a schematic lateral cross-section of a reel according to the present exemplary embodiment.

Namely, as shown in FIGS. 3 and 4, there is an upper circular cylinder portion (connecting member) 24A provided coaxially and extending vertically down from the inner edge portion of the upper flange 24, and there is a lower circular cylinder portion (connecting member) 26A extending upwards from the top face of the lower flange 26, the lower circular cylinder portion 26A being of substantially the same diameter as the upper circular cylinder portion 24A. The reel hub 22 has an internal diameter dimension that is larger than the external diameter dimension of the lower circular cylinder portion 26A and that of the upper circular cylinder portion 24A, and the reel hub 22 is fitted over the outside of the lower circular cylinder portion 26A and the upper circular cylinder portion 24A in a non-contact state (a state in which there is a predetermined gap formed between the outer peripheral faces of the lower circular cylinder portion 26A and the upper circular cylinder portion 24A, and the inner peripheral face of the reel hub 22).

The length of the reel hub 22 is about the same length as the combined lengths of the lower circular cylinder portion 26A and the upper circular cylinder portion 24A, and a triangular cross-section welding rib 25 protrudes out from a central portion of the top face of the lower circular cylinder portion 26A (or from a central portion of the bottom face of the upper circular cylinder portion 24A), along the circumferential direction thereof. There are also at least three ribs 23 (engaging portions), of a predetermined length (including the width) and predetermined height, protruding from the top face of the lower flange 26 coaxially at substantially even intervals around the outside of the lower circular cylinder portion 26A. There are at least three engaging grooves (engaged portions) 22A formed intermittently along the circumferential direction of the reel hub 22, at positions facing the ribs 23 and at the same intervals as the ribs 23. The engaging grooves 22A have a predetermined length (including the width) and a predetermined depth, such that the ribs 23 may be inserted within the engaging grooves 22A in a state where there is negligible gap in the circumferential direction, and there is a predetermined gap in the reel hub 22 radial direction.

Accordingly, the reel hub 22 is fitted over the outside of the lower circular cylinder portion 26A of the lower flange 26, the ribs 23 of the lower flange 26 engage with the engaging grooves 22A of the reel hub 22, positioning (centering) of the reel hub 22 with respect to the upper flange 24 is determined, the upper circular cylinder portion 24A of the upper flange 24 is inserted within the reel hub 22 and the bottom end face of the upper circular cylinder portion 24A contacts the top end face of the lower circular cylinder portion 26A. The upper circular cylinder portion 24A is welded to the lower circular cylinder portion 26A in this state, by emitting ultrasonic radiation and melting the welding rib 25.

That is, in the above configuration, the upper flange 24 the lower flange 26 and the reel hub 22 are assembled in a coaxially disposed state (maintained in a coaxial state), the reel hub 22 is supported by the upper and lower flanges 24, 26, and also the reel hub 22 is not able to rotate relative to the upper and lower flanges 24, 26 (unable to move relatively in the circumferential direction). This is also a configuration in which the reel hub 22 is not influenced by deformations in the upper and lower flanges 24, 26, or vice-versa.

Namely, the reel 20, by such a configuration, deformation of the reel hub 22 does not move/affect the upper and lower flanges 24, 26, or vice-versa, since there is a predetermined gap formed in the reel hub 22 radial direction between the engaging grooves 22A and the ribs 23, and since there are predetermined gaps formed from the outer peripheral faces of the lower circular cylinder portion 26A and of the upper circular cylinder portion 24A to the inner peripheral face of the reel hub 22 (a non-contact state).

It should be noted that in the present exemplary embodiment configuration is with the circular cylinder shaped upper circular cylinder portion 24A of the upper flange 24 extending vertically down therefrom, and the circular cylinder shaped lower circular cylinder portion 26A of the lower flange 26 extending up therefrom, with these welded/connected together, and the reel hub 22 supported on the upper flange 24 and the lower flange 26. However, one or other of the upper flange 24 or the lower flange 26 may be of substantially the same height as the reel hub 22, and a connecting member disposed on the inside of the reel hub 22 (not illustrated), with this connecting member directly connected to the lower flange 26 or the upper flange 24, and the reel hub 22 supported by the upper flange 24 and the lower flange 26.

The expression "connected" includes the upper circular cylinder portion 24A and the lower circular cylinder portion 26A being fastened together with a snap-fit, as well as the upper circular cylinder portion 24A and the lower circular cylinder portion 26A being welded together. Namely, if the shape of the upper circular cylinder portion 24A and the lower circular cylinder portion 26A is changed and, for example, an anchoring portion (not illustrated) is provided to the upper circular cylinder portion 24A, and an anchored portion (not illustrated), which is anchored by the anchoring portion, provided to the lower circular cylinder portion 26A, then a structure in which the upper circular cylinder portion 24A and the lower circular cylinder portion 26A are fastened together by the anchoring of the anchoring portion to the anchored portion may be used.

Furthermore, as shown in FIG. 4, the outer peripheral face of the reel hub 22 is formed with a larger radius in cross-section at the upper flange 24 side than at the lower flange 26 side, and the radial difference ΔR of the reel hub 22 between the upper flange 24 side and the lower flange 26 side is between 5 μm and 60 μm. Namely, relative to the recording tape T width (in this instance ½ inch, about 12.65 mm), the radial difference ΔR of the reel hub 22 between the upper flange 24 side and the lower flange 26 side is within the range of from 0.00039 to 0.00474.

Figure 10:
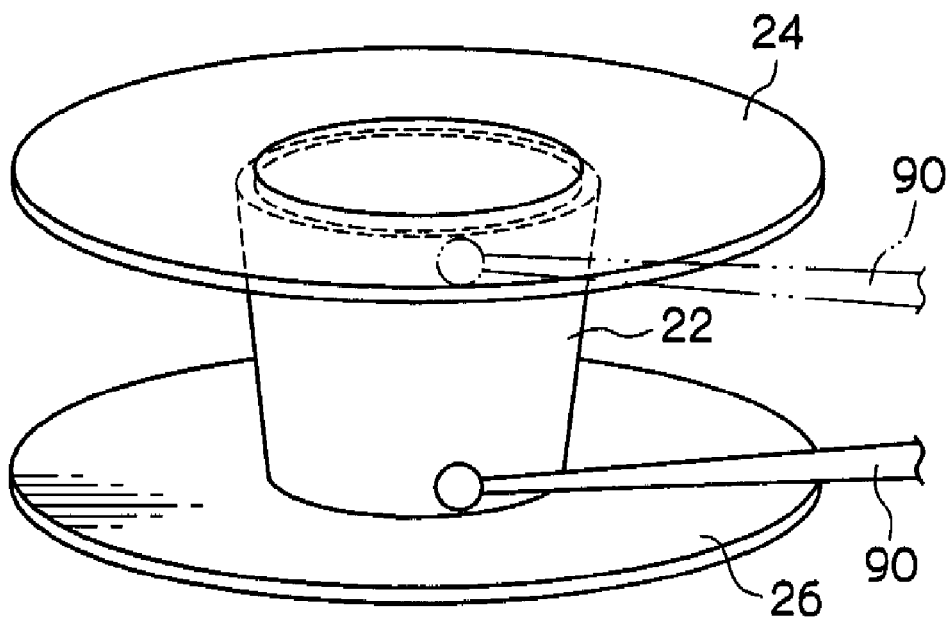
FIG. 10 is a schematic perspective view for explaining a reel radius measurement method.

Explanation will now be given of the measurement method of the reel hub 22 outer peripheral face radius. As shown in FIG. 10, the reel 20 is set with a chucking portion (reel gear 44, described later) of the drive device 70 of the reel 20 at the bottom, and with a non-illustrated master chucking gear (high precision standard gear) at the top. Then, in this state, the external profile of the reel hub 22 is measured from the bottom end up to the top end using a contact three-dimensional measurement instrument touch sensor probe 90.

It should be noted that when the measurements of the reel hub 22 radius is carried out, the arbitrary center (axial center) is taken as the center (axial center) of the master chucking gear. Moreover, since the touch sensor probe 90 used has a diameter of 1 mm, the measurement position at the top end and the measurement position at the bottom end are each set so that the center position of the touch sensor probe 90 when carrying out the measurements is in the range of from 0.7 mm to 1.0 mm from the top end and the bottom end of the reel hub 22, so that the upper flange 24 and the lower flange 26 do not interfere with the measurements. Measurement points are then set at substantially even intervals such that the total number of measurement points is 10 points or more. These measurements are carried out at six positions 60 degrees apart.

The radial difference of the reel hub 22 between the upper flange 24 side and the lower flange 26 side, ΔR, is derived from these results, where ΔR=ΔRmax−(ΔRmax−ΔRmin)/2= (ΔRmax+ΔRmin)/2. It should be noted that ΔRmax is the largest value of ΔR1 to ΔR6, and ΔRmin is the smallest value of ΔR1 to ΔR6, wherein ΔR1 to ΔR6 are the radius value at the larger radius side (upper flange 24 side)–the smaller radius value (the lower flange 26 side) of the reel hub 22 at 6 positions at 60 degree intervals (n=1 to 6).

With regard to the external profile of the reel hub 22, as long as the radius of the upper flange 24 side and the lower flange 26 side are different, the outer peripheral face of the reel hub 22 does not necessarily need to be a straight taper when viewed from the side. For instance, there may be fine indentations/protrusions on the outer peripheral face of the reel hub 22, or the outer peripheral face of the reel hub 22 may follow a curved line when viewed from the side. The outer peripheral face of the reel hub 22 may also have an angle formed therein when viewed from the side, and there may also be a portion thereof which runs parallel to the axial line of the reel hub 22.

The recording tape T serving as an information recording/reproducing medium, such as a magnetic tape, is wound on the outer peripheral face of the reel hub 22 of the reel 20 with a predetermined winding force (tension/tensional force) F (for example, F=0.588N to 0.980N), such that the fluctuation width in the width direction of the wound recording tape T is restricted by the upper flange 24 and the lower flange 26. It should be noted that there are tapered faces 24B, 26B formed such that the distance between the faces of the upper flange 24 and the lower flange 26 gradually increases on progression toward the outside (toward the outer peripheral edge side) thereof (see FIGS. 3 and 4). The recording tape T has a thickness of 7.5 μm or less, preferably 6.9 μm, or less, in order to increase the recording capacity.

When the recording tape T is wound on a highly rigid reel hub 22 then there is good winding shape (winding form). For example, the applicant has found by investigations that there is good winding shape (winding form) when the recording tape T is wound on an reel hub 22 from aluminum with a Young's modulus (modulus of elasticity) of about 70 GPa, and there is even better winding shape (winding form) when the recording tape T is wound on a reel hub 22 from stainless steel with a Young's modulus (modulus of elasticity) of about 190 GPa or of about 210 GPa.

Accordingly, winding the recording tape T on a reel hub 22 of high Young's modulus (modulus of elasticity) tends to produce neat winding. Therefore, the material of the reel hub 22 is not limited to a synthetic resin (plastic), and, for example, a reel hub 22 configured from a metal such as aluminum and stainless steel, or a synthetic resin (plastic) reel hub 22 with an aluminum or stainless steel metal ring (not illustrated) insert formed or press fitted to the inner peripheral face side of the reel hub 22, or integrated within the reel hub 22, may be used.

Furthermore, the recording tape T usually curves in the width direction (toward the top or toward the bottom), and in this exemplary embodiment, a positive curvature is defined as, with the upper edge $T_A$ of the recording tape T viewed at the top, and the recording tape T curves out toward the top, and a negative curvature is when the curvature is in toward the bottom. Accordingly, the recording tape T shown in FIG. 14 with the upper edge $T_A$ at the top side has a positive curvature, whereas the recording tape T shown in FIG. 15 with the upper edge $T_A$ at the top side is a negative curvature recording tape T. The reel 20 of the present exemplary embodiment is one in which a positive curvature recording tape T is wound on the reel hub 22, with the curvature amount ΔD being within the range of from 0.15 mm to 2.5 mm.

Figure 11:
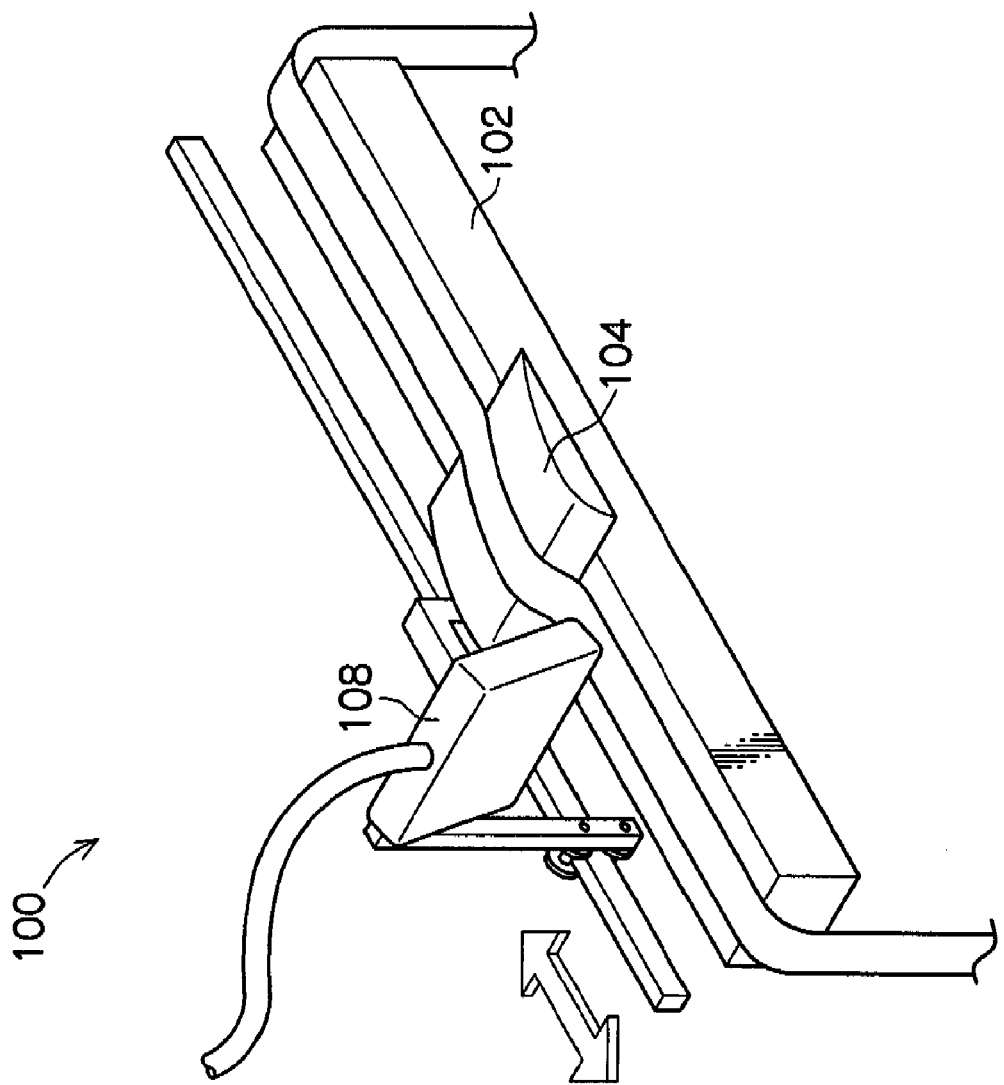
FIG. 11 is a schematic perspective view showing a tape profile measuring device, for measuring the amount of recording tape curvature.

The "curvature amount ΔD" is defined with reference to a reference line which connects edge points at two ends of a 1.0 m length of recording tape T, and is the separation distance at the edge centre, between the two ends of the recording tape T, from the reference lines. Explanation will now be given of the method of measuring the curvature amount ΔD of the recording tape T. FIG. 11 shows a tape profile measuring device 100. The tape profile measuring device 100 is provided with a substantially rectangular electrostatic attraction table 102, and a guide member 104 is provided above the electrostatic attraction table 102.

The guide member 104, as shown in FIGS. 12A and 12B, is configured so as to be able to pass horizontally along the length direction of the electrostatic attraction table 102, above the electrostatic attraction table 102 in a state with a gap between the guide member 104 and the electrostatic attraction table 102 upper surface (attraction surface 102A), and with the recording tape T, which has been cut in advance into a 1 m section with some extra at each end thereof, covering the back face of the guide member 104. Air is blown on the recording tape T from a nozzle 108, with both ends of the recording tape T, with the extra length attached, in a free state.

The guide member 104 and the nozzle 108 are then slid (moved) at a predetermined speed along the attraction surface 102A, with the air still blowing at the recording tape T. The recording tape T is thereby guided at an even distance above the attraction surface 102A in a state in which excess force is removed therefrom, and guided back again onto the attraction surface 102A.

Figure 13:
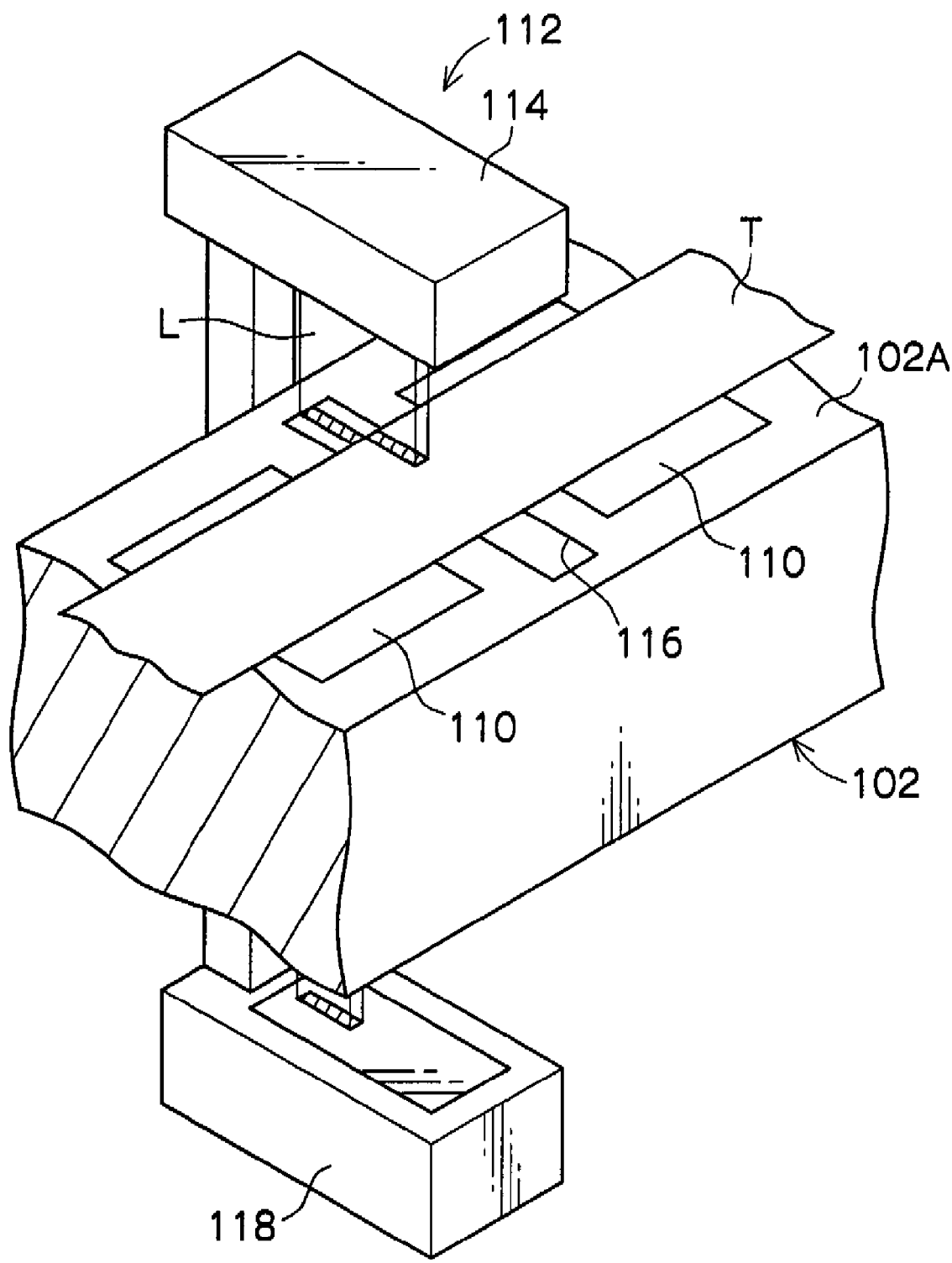
FIG. 13 is schematic perspective view showing an optical measuring apparatus used for measuring the amount of recording tape curvature.

Furthermore, as shown in FIG. 13, there are plural electrode pairs 110 along the length direction of the electrostatic attraction table 102, and as the recording tape T is guided onto the attraction surface 102A, the switches of the electrode pairs 110 facing the recording tape T are activated in sequence, and the attraction surface 102A charges in sequence corresponding to the guiding of the recording tape T. The recording tape T is thereby charged with static electricity (electrical charge), and attracted onto the attraction surface 102A in sequence by electrostatic attraction.

In addition, the air blown out from the nozzle 108 presses the attracted recording tape T with a predetermined pressure. When the recording tape T is pressed with the predetermined pressure, the attraction surface 102A and the lower face of the recording tape T are pressed together and air present between the recording tape T and the attraction surface 102A is pushed out. Accordingly, the recording tape T can be adhered closely to the attraction surface 102A.

Next, the shape of the recording tape T attracted to the attraction face 102A is measured by an optical measuring device 112. The electrostatic attraction table 102 is provided with transparent portions 116 through which lasers L, applied from laser generators 114 of the optical measuring device 112, may pass. The lasers L are applied to the transparent portions 116 with the recording tape T attracted to the attraction face 102A, and laser-light receivers 118 disposed below the electrostatic attraction table 102 receive light from the lasers L that has passed through the portions 116. The position of the edge of the recording tape T may thereby be measured.

Figure 14:
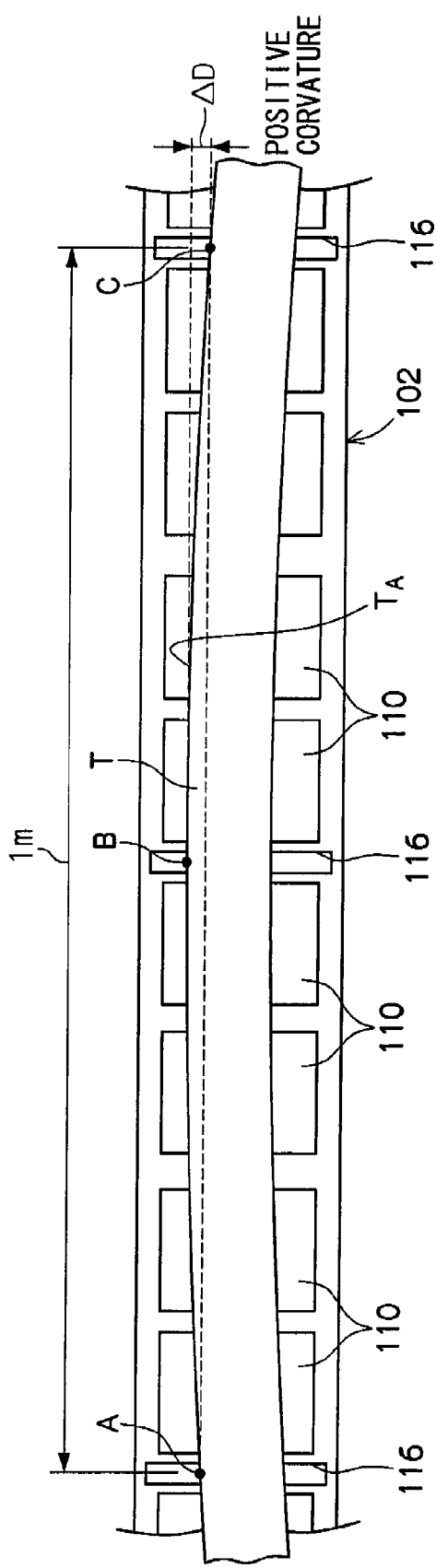
FIG. 14 is a schematic plan view showing a method for measuring the curvature amount of a positive curvature recording tape.

Specifically, as shown in FIG. 14, the lasers L, radiating strip shapes that are aligned along the width direction of the recording tape T, are respectively applied from the laser generators 114 disposed above measurement points A, B, and C, respectively, astride a reference line AC that connects the measurement points A and C. Then, the laser-light receivers 118 respectively disposed below the electrostatic attraction table 102, namely below the respective measurement points A, B, and C, receive the lasers L which have passed through the respective transparent portions 116. When this is carried out, the amount of light received from the width direction strip shaped laser L (the length in the width direction through which light from the laser L passes) decreases when the recording tape T is curved.

Then, by detecting with the laser-light receivers 118 the lengths in the width direction of the light from the laser L which has passed through the portions 116, the positions of the measurement points A, B, and C are obtained (the position of the upper edge $T_A$). Then, based on the positions of the measurement points A, B, and C, the distance between the reference line AC and the measurement point B, i.e. displacement ($\Delta D$), is calculated and the calculated value is taken as the amount of curvature at the measurement point B. JISX6175 specifies that the length of the reference line AC is 1.0 m.

Figure 15:
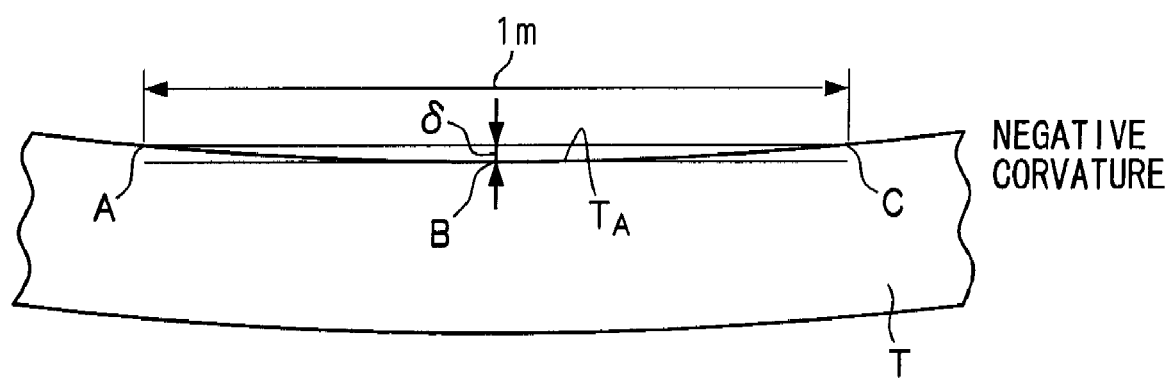
FIG. 15 is a schematic plan view showing a negative curvature of a recording tape.

As shown in FIG. 14, if the tape edge with the smaller radius of curvature of the recording tape T is positioned on the lower side in the drawing, namely if the reference line AC is covered with the recording tape T, then the polarity of the recording tape T is said to have a positive curvature. On the other hand, as shown in FIG. 15 (FIG. 15 is a simplified version of FIG. 14), if the tape edge with the smaller radius of curvature of the recording tape T is positioned on the upper side in the drawing, namely a gap δ is created between the reference line AC and the upper tape edge of the recording tape T (the upper edge $T_A$) the polarity of the recording tape T is said to have a negative curvature. When the recording tape T is wound on the reel hub 22, the upper edge $T_A$ side is on the upper flange 24 side of the reel hub 22.

As shown in FIG. 2, there is a reel gear 44 formed in a ring on the bottom face of a bottom wall 28 of the lower flange 26, and there is a gear opening 40 formed at a central portion of the lower case 16 for exposing the reel gear 44 to the outside therethrough (see, FIGS. 3 and 4). The reel gear 44 exposed through the gear opening 40 is meshed with a drive gear (not illustrated) on the drive device 70 side (see FIG. 5), and the reel 20 in the case 12 is relatively rotatable with respect to the case 12 by rotational driving of the reel gear 44.

An annular reel plate 46 (see FIGS. 3 and 4) made of magnetic material is secured by insert molding or the like to the lower face of the bottom wall 28 on a radially inner side of the reel gear 44 so as to be attracted to and retained by magnetic force of an annular magnet (not shown) on the drive device 70 side. Moreover, the reel 20 is retained while being prevented from rattling about by free movement regulating walls 42 respectively formed to protrude as inner walls from inner faces of the upper case 14 and the lower case 16 in locations on the locus of a circle that is coaxial with the gear opening 40.

An opening 18, through which the recording tape T wound around the reel 20 is drawn out, is formed in a right side wall 12B of the case 12. A leader pin 30 is secured to a free end portion of the recording tape T drawn out from the opening 18, while engaged (gripped) by a leader block 85 (see FIG. 7(A)) that is a drawing-out member of the drive device 70. Annular grooves 32 are formed at two opposite end portions of the leader pin 30 protruding from end portions in the width direction of the recording tape T, and the annular grooves 32 are engaged with hooks 85A of the leader block 85 (see FIG. 7(B)).

Inside the opening 18 of the case 12, namely on an inner face of the top plate 14A of the upper case 14 and an inner face of the bottom plate 16A of the lower case 16, a pair of upper and lower pin retaining portions 36 is formed, for positioning and retaining the leader pin 30 in the case 12. The pin retaining portions 36 are substantially semicircular in shape and open to the drawing-out side of the recording tape T, and both end portions 34 of the upright leader pin 30 may enter and exit the pin retaining portions 36 from the open side.

A leaf spring 38 is fixed and disposed in a vicinity of the pin retaining portions 36. Bifurcate tip end portions of the leaf spring 38 are respectively engaged with the upper and lower both end portions 34 of the leader pin 30, so as to retain the leader pin 30 in the pin retaining portions 36. It should be noted that configuration is made such that when the leader pin 30 enters and exits the pin retaining portions 36, the tip end portions of the leaf spring 38 are elastically deformed by a suitable amount, so as to allow movement of the leader pin 30.

The opening 18 is opened and closed with a door 50. The door 50 is formed in a substantially rectangular plate shape of such a size as to be able to close the opening 18. Groove portions 64 are formed in the top plate 14A and the bottom plate 16A, such that the upper and lower end portions of the door 50 fit into the groove portions 64 so as to be able to slide along the right side wall 12B of the case 12.

A shaft 52 protrudes from the center of a rear end portion of the door 50 and a coil spring 58 is fitted over the shaft 52. A flared portion 54 for preventing the coil spring 58 from falling out is formed at a rear end of the shaft 52. A support table 60 protrudes from the lower case 16 and has a locking portion 62 for locking the rear end of the coil spring 58 fitted over the shaft 52.

Therefore, the door 50 is constantly biased in the direction to close the opening 18 with biasing force of the coil spring 58, due to the shaft 52 being slidably supported on the support table 60 and the rear end of the coil spring 58 being locked by the locking portion 62. It should be noted that it is preferable to further provide a support table 66, protruding at the rear side of the support table 60, to support the shaft 52 when the opening 18 is open.

A protruding portion 56 is formed protruding outward from a front end portion of the door 50, for opening and closing operations. The protruding portion 56 is engaged with an opening and closing member (not illustrated) of the drive device 70 when the recording tape cartridge 10 is loaded in the drive device 70. As a result, the door 50 is opened against the biasing force of the coil spring 58.

An example of the drive device 70 in which the recording tape cartridge 10 is loaded will now be described. As shown in FIGS. 5, 6, 7A and 7B, the drive device 70 has a take-up reel 80, which houses the leader block 85, for gripping the leader pin 30 of the recording tape cartridge 10 and around which the recording tape T, drawn out with the leader pin 30, is wound.

The take-up reel 80 is configured substantially the same as the reel 20. Namely, the take-up reel 80 is formed with: a cylindrical reel hub 82, forming an axial center portion (winding center); a ring shaped upper flange 84, disposed at an upper end portion of the reel hub 82; a circular plate shaped lower flange 86, disposed at a lower end portion of the reel hub 82, wherein the upper and lower flanges 84, 86 are formed from separate bodies so as to be independent from each other.

Namely, there is an upper circular cylinder portion (connecting member) 84A provided coaxially and extending vertically down from the inner edge portion of the upper flange 84, and there is a lower circular cylinder portion (connecting member) 86A extending upwards from the top face of the lower flange 86, the lower circular cylinder portion 86A being of substantially the same diameter as the upper circular cylinder portion 84A. The reel hub 82 has an internal diameter dimension that is just slightly larger than the external diameter dimension of the lower circular cylinder portion 86A and the upper circular cylinder portion 84A, and the reel hub 82 is fitted over the outside of the lower circular cylinder portion 86A and the upper circular cylinder portion 84A, in a non-contact state (a state in which there is a predetermined gap formed between the outer peripheral faces of the lower circular cylinder portion 86A and the upper circular cylinder portion 84A, and the inner peripheral face of the reel hub 82).

The length of the reel hub 82 is about the same length as the combined lengths of the lower circular cylinder portion 86A and the upper circular cylinder portion 84A, and a triangular cross-section welding rib (not illustrated) protrudes out from a central portion of the top face of the lower circular cylinder portion 86A (or from a central portion of the bottom face of the upper circular cylinder portion 84A), along the circumferential direction thereof. There are also at least three ribs (engaging portions, omitted in the drawings), of a predetermined length (including width) and predetermined height, protruding coaxially at substantially even intervals around the outside of the lower circular cylinder portion 86A of the lower flange 86. There are also at least three engaging grooves (engaged portions, omitted in the drawings) formed intermittently along the circumferential direction of the reel hub 82, at positions facing the ribs and at the same intervals as the ribs, the engaging grooves 82A having a predetermined length (including width) and a predetermined depth, such that the ribs may be inserted within the engaging grooves in a state where there is negligible gap therebetween in the circumferential direction, and there is a predetermined gap in the reel hub 82 radial direction.

Accordingly, the reel hub 82 is fitted over the outside of the lower circular cylinder portion 86A of the lower flange 86, the ribs of the lower flange 86 engage with the engaging grooves of the reel hub 82, positioning (centering) of the reel hub 82 with respect to the upper flange 84 is determined, the upper circular cylinder portion 84A of the upper flange 84 is inserted within the reel hub 82 and the bottom end face of the upper circular cylinder portion 84A contacts the top end face of the lower circular cylinder portion 86A. The upper circular cylinder portion 84A is welded to the lower circular cylinder portion 86A in this state, by emitting ultrasonic radiation and melting the welding rib 85.

That is, in the above configuration, the upper flange 84 the lower flange 86 and the reel hub 82 are assembled in a coaxially disposed state (maintained in a coaxial state), the reel hub 82 is supported by the upper and lower flanges 84, 86, and also the reel hub 82 is not able to rotate relative to the upper and lower flanges 84, 86 (unable to move relatively in the circumferential direction). This is also a configuration in which the reel hub 82 is not influenced by deformations in the upper and lower flanges 84, 86, or vice-versa.

Namely, the reel 80, by such a configuration, deformation of the reel hub 82 does not move/affect the upper and lower flanges 84, 86, or vice-versa, since there is a predetermined gap formed in the reel hub 82 radial direction between the engaging grooves and the ribs, and since there are predetermined gaps formed from the outer peripheral faces of the lower circular cylinder portion 86A and of the upper circular cylinder portion 84A to the inner peripheral face of the reel hub 82 (a non-contact state).

It should be noted that in the present exemplary embodiment configuration is with the circular cylinder shaped upper circular cylinder portion 84A of the upper flange 84 extending vertically down therefrom, and the circular cylinder shaped lower circular cylinder portion 86A of the lower flange 86 extending up therefrom, with these welded/connected together, and the reel hub 82 supported on the upper flange 84 and the lower flange 86, however, one or other of the upper flange 84 or the lower flange 86 may be of substantially the same height as the reel hub 82, and a connecting member disposed on the inside of the reel hub 82 (not illustrated), with this connecting member directly connected to the lower flange 86 or the upper flange 84, and the reel hub 82 supported by the upper flange 84 and the lower flange 86, in the same manner as with the reel 20.

Furthermore, the outer peripheral face of the reel hub 82 is formed with a larger radius in cross-section at the upper flange 84 side than at the lower flange 86 side, and the radial difference ΔR of the reel hub 82 between the upper flange 84 side and the lower flange 86 side is between 5 μm and 60 μm (the radial difference ΔR of the reel hub 82 between the upper flange 84 side and the lower flange 86 side is within the range of from 0.00039 to 0.00474), in a similar manner as with the reel 20.

With regard to the external profile of the reel hub 82, as long as the radius of the upper flange 84 side and the lower flange 86 side are different, the outer peripheral face of the reel hub 82 does not necessarily need to be a straight taper when viewed from the side. For instance, there may be fine indentations/protrusions on the outer peripheral face of the reel hub 82, or the outer peripheral face of the reel hub 82 may follow a curved line when viewed from the side. The outer peripheral face of the reel hub 82 may also have an angle formed therein when viewed from the side, and there may also be a portion thereof which runs parallel to the axial line of the reel hub 82.

There are also tapered faces 84B, 86B formed to the mutually opposing faces of the upper flange 84 and the lower flange 86, such that the distance between the faces of the upper flange 84 and the lower flange 86 gradually increases on progression toward the outside (toward the outer peripheral edge side) thereof (see FIG. 6), and the recording tape T which has been wound up on the reel hub 82 is restricted from displacing in the width direction by these tapered faces 84B, 86B. This is similar to as with the reel 20.

Increased rigidity of the reel hub 82 is preferable, in a similar manner to as with the reel 20. Therefore, the material of the reel hub 82 is not limited to a synthetic resin (plastic), and, for example, a reel hub 82 configured from a metal such as aluminum and stainless steel, or a synthetic resin (plastic) reel hub 82 with an aluminum or stainless steel metal ring (not illustrated) insert formed or press fitted to the inner peripheral face side of the reel hub 82, or integrated within the reel hub 82, may be used.

Figure 7A:
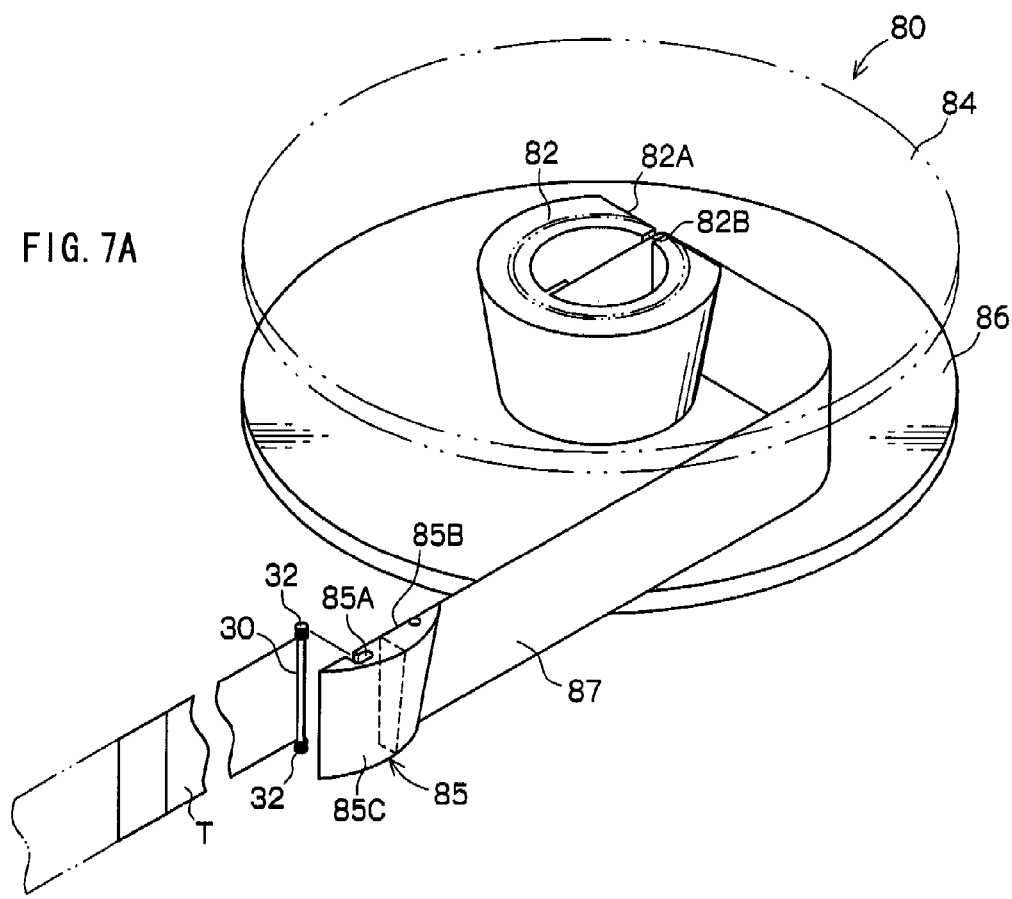
FIGS. 7A and 7B are schematic perspective views showing a configuration of a drawing-out member of a take-up reel.
Figure 7B:
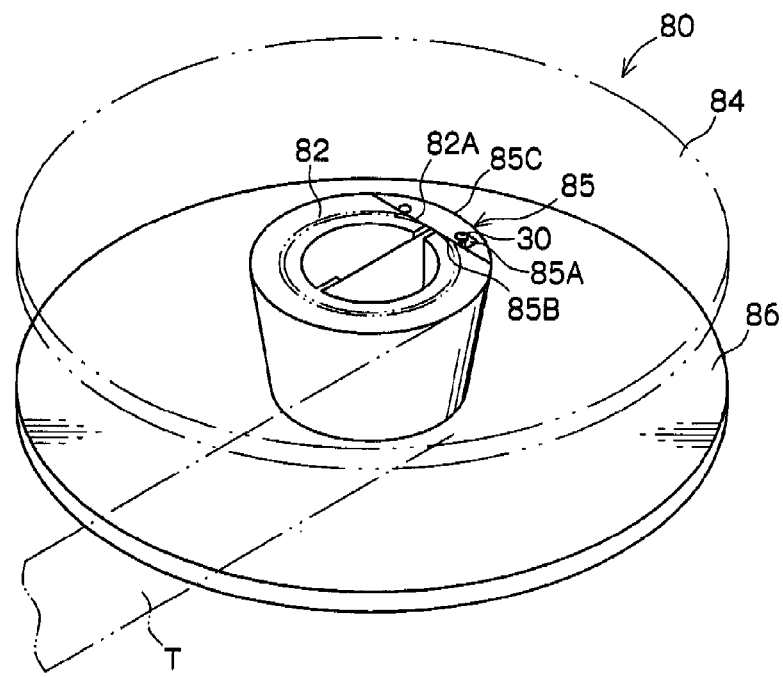

The reel hub 82 of the take-up reel 80, as shown in FIGS. 7A and 7B, is provided with the leader block 85 for gripping the leader pin 30, the leader block 85 being formed in an arc shape in plan view so that it may be attached to (may be housed in) and detached from the reel hub 82. A slit portion 82B for accepting a leader tape 87 that is attached to one end portion of the leader block 85 is formed along the height direction (the axial direction of the reel hub 82) of a flat face 82A of the reel hub 82, which is exposed when the leader block 85 is detached.

The leader block 85 is mounted to the reel hub 82 in a state in which the flat face 85B of the leader block 85 faces the flat face 82A of the reel hub 82, and in this state the leader block 85 forms a part of an outer peripheral face (winding face) of the reel hub 82. It is necessary to make an arc face (winding face) 85C of the leader block 85 a similar shape to the outer peripheral face of the reel hub 82.

The leader block 85 forms a part of the winding face of the reel hub 82 when it is mounted to the reel hub 82. Therefore, if a difference in level is created between the arc face 85C of the leader block 85 and the outer peripheral face of the reel hub 82, deformation (transmission of the step to layers above) of the recording tape T is caused by the difference in level when the recording tape T is wound around the reel hub 82 and the possibility of drop-out error occurring at that portion increases.

Therefore, if the arc face 85C side of the leader block 85 is similar in shape to the outer peripheral face of the reel hub 82, the arc face 85C of the leader block 85 and the outer peripheral face of the reel hub 82 become substantially flush with each other when the leader block 85 is mounted to the reel hub 82, such that there is no step around the whole of the outer peripheral face of the reel hub 82.

The drive device 70 is also provided with plural tape guides 72, 74, 76, and 78 (in this case four tape guides are provided). The tape guides 72 to 78 are formed with cylindrical hubs 72C to 78C, flanges 72A to 78A formed at the upper side of the tape guides 72 to 78, and flanges 72B to 78B formed at the lower side thereof, and the position of the recording tape T drawn out of the recording tape cartridge 10 loaded in the drive device 70 is regulated thereby in the up-down direction (the axial direction of the hubs 72A to 78A). A recording and reproducing head 88 is disposed between the tape guide 74 and the tape guide 76. The recording and reproducing head 88 performs recording and reproduction of information on the recording tape T.

Operation of the recording tape cartridge 10 and the drive device 70 having the above configurations will now be described. In the recording tape cartridge 10 configured as above, the opening 18 is closed with the door 50 when the cartridge 10 is not loaded in the drive device 70 and is not in use (during storage or transportation). When the recording tape T is used, the recording tape cartridge 10 is loaded into the drive device 70 in the direction of arrow A, with the front wall 12A leading.

Then, the recording tape cartridge 10 is inserted into a bucket, and the opening and closing member provided to the bucket (on the drive device 70 side) engages with the protruding portion 56 of the door 50. If the recording tape cartridge 10 in this state moves further in the direction of the arrow A, the opening and closing member moves the protruding portion 56 relatively rearward against the biasing force of the coil spring 58. Then, the door 50 provided with the protruding portion 56 slides rearward in the groove portions 64 along the right wall 12B, opening the opening 18.

When the recording tape cartridge 10 has been loaded into the drive device 70 (bucket) to a predetermined depth and the opening 18 has been completely opened, the bucket in which the recording tape cartridge 10 is housed moves down through a predetermined distance, and a positioning member (not shown) of the drive device 70 is inserted, relatively, into a positioning hole portion (not shown) formed in the lower case 16. Accordingly, the recording tape cartridge 10 is accurately positioned in a predetermined position in the drive device 70 and further sliding (rearward movement) of the door 50 is restricted.

Figure 6:
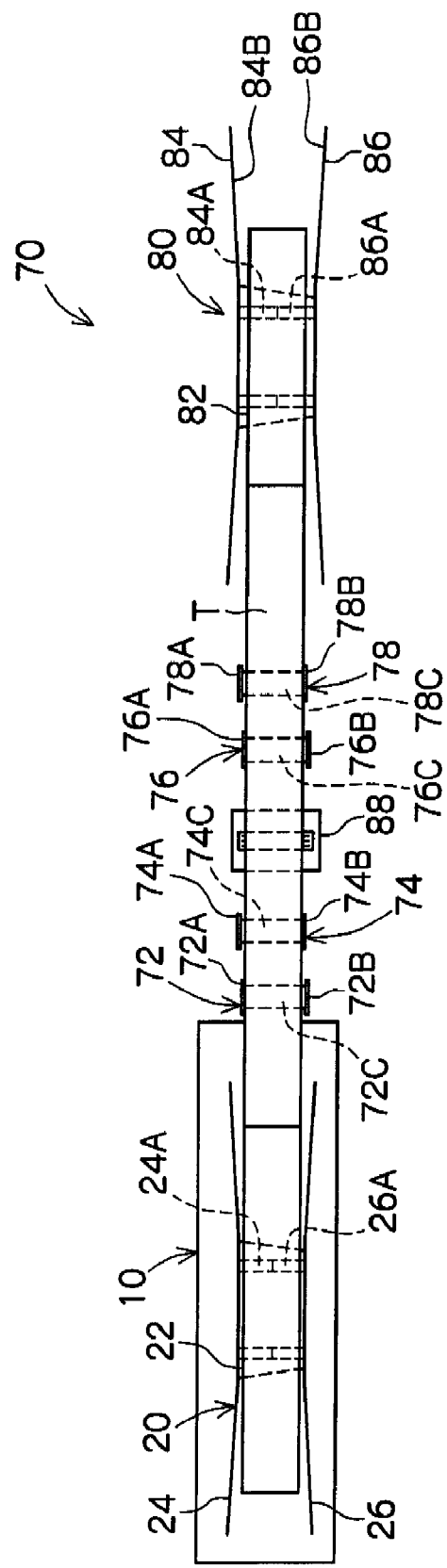
FIG. 6 is a schematic side view of a drive device after mounting with a recording tape cartridge.

As a result of the downward movement of the recording tape cartridge 10 (bucket), the drive gear enters, relatively, from the gear opening 40, engages with the reel gear 44 and moves the reel 20 up to a predetermined height (see FIG. 6). Then, in a state in which the drive gear and the reel gear 44 are completely meshed with each other, the reel plate 46 is attracted to and retained by the magnetic force of the annular magnet provided inside the drive gear. As a result, the reel 20 is brought into an unlocked state in which it is rotatable with respect to the case 12, while the reel gear 44 is kept meshed with the drive gear.

The leader block 85 provided to the drive device 70 enters from the opened opening 18 into the case 12 (see FIG. 7A) and grips and draws out the leader pin 30 positioned and retained at the pin retaining portions 36. It should be noted that when this occurs, because the recording tape cartridge 10 is accurately positioned in the drive device 70, the hooks 85A of the leader block 85 may be reliably locked to the annular grooves 32 of the leader pin 30. The reel 20 may rotate as the leader pin 30 is drawn out, since locking of the rotation of the reel 20 has been released.

The leader block 85 gripping the leader pin 30 is drawn out from the opening 18 and, as shown in FIG. 7B, by rotation of the take-up reel 80, is mounted (housed) to the reel hub 82 in such a manner as to configure part of the reel hub 82. Then, by synchronously rotation driving the take-up reel 80 and the reel 20, the recording tape T is successively drawn out of the case 12 while being wound around the take-up reel 80.

Figure 5:
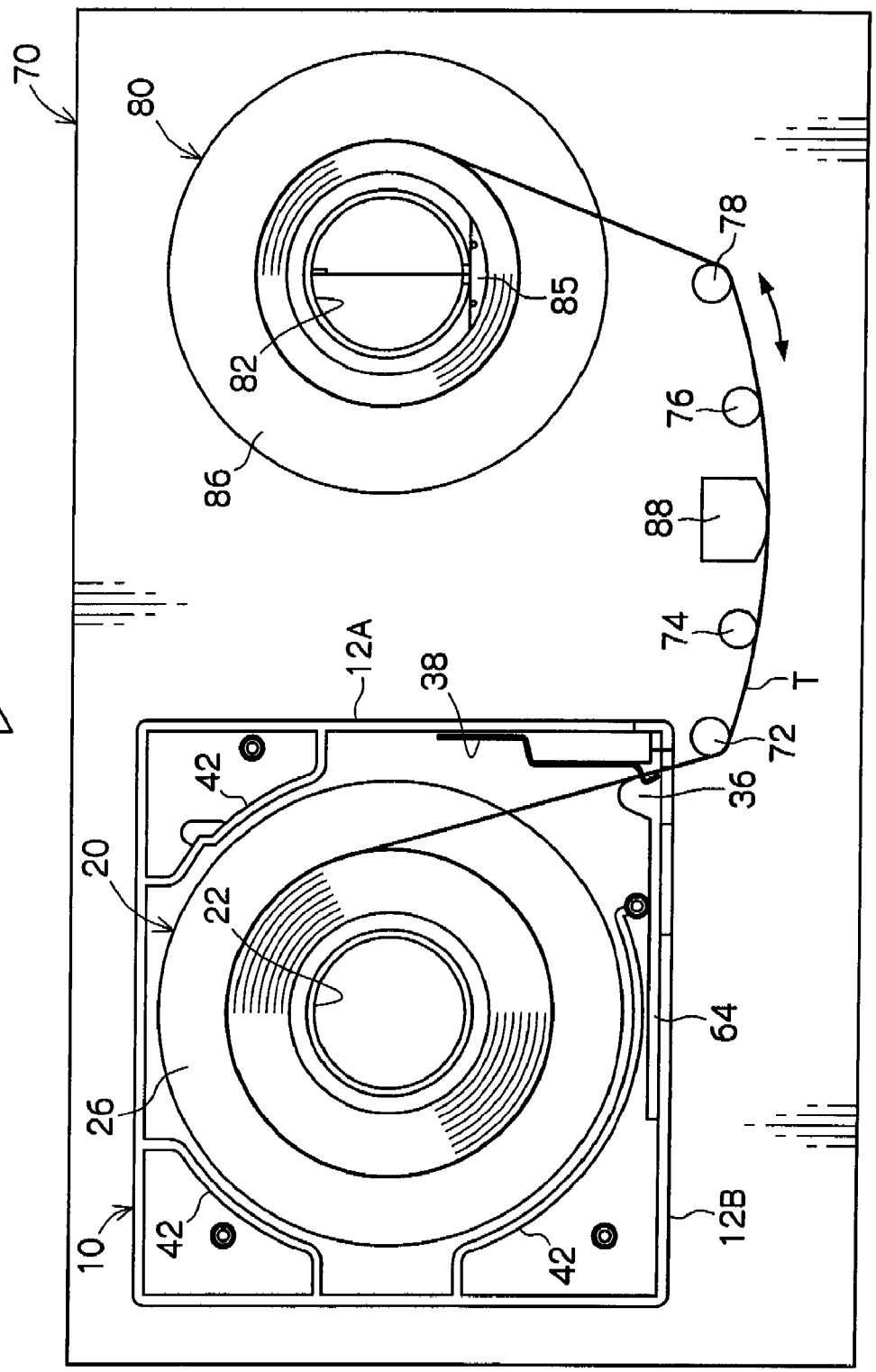
FIG. 5 is a schematic plan view of a drive device after mounting with a recording tape cartridge.

As this occurs, as shown in FIGS. 5 and 6, the recording tape T drawn out of the case 12 comes into sliding contact with the tape guide 72 that has been disposed in the vicinity of the recording tape cartridge 10. The tape guide 72 is rotatably supported and is mounted in such a manner that its height position is at a central position, or deviates from the central position to the upper or lower side thereof, such as, for example, to the lower side.

Therefore, the recording tape T in sliding contact with the tape guide 72, runs while the position of the upper edge of the tape T is regulated by the upper side flange 72A of the tape guide 72, and then comes into sliding contact with the tape guide 74. The tape guide 74 is assembled in such a manner that the central position in its width direction (the height direction) deviates to the upper side from the central position of the width direction (the height direction) of the reel hub 22, and the lower flange 74B regulates the position of the lower edge of the recording tape T.

The recording tape T, whose position has been regulated by the tape guide 74, next comes into sliding contact with the tape guide 76. It should be noted that before the recording tape T comes into sliding contact with the tape guide 76, it comes into sliding contact with the recording and reproducing head 88. The tape guide 76 is mounted in such a manner that a central position of its width direction (the height direction) deviates to a lower position from the central position in the width direction (the height direction) of the reel hub 22, the opposite direction to the tape guide 74 but similar to the tape guide 72, and the position of the upper edge of the recording tape T is regulated by the upper flange 76A.

The recording tape T, whose position has been regulated by the tape guide 76, finally comes into sliding contact with the tape guide 78. The tape guide 78 is mounted in such a manner that a central position in its width direction (the height direction) deviates to an upper position from the central position in the width direction (the height direction) of the reel hub 22, similarly to the tape guide 74, and the position of the lower edge of the recording tape T is regulated by the lower side flange 78B.

Accordingly, since the height positions (positions in the width direction) of the respective tape guides 72 to 78 in the drive device 70 are alternately different along the tape path of the recording tape T in the above manner, there is the advantage that the position of the recording tape T in the width direction (up-down direction) may be suitably regulated. It should be noted that since each of the tape guides 72 to 78 are rotatably supported, there is seldom damage to the edges of the recording tape T by each of the tape guides 72 to 78.

The leader pin 30 is housed in the reel hub 82 of the take-up reel 80, while the position of the recording tape T in the width direction (up-down direction) is regulated by the tape guides 72 to 78, the take-up reel 80 and the reel 20 are synchronously rotationally driven. As a result, the recording tape T is successively drawn out of the case 12 while being wound on the take-up reel 80, and the recording and reproducing head 88 disposed between the predetermined tape guides 74 and 76 carries out recording or reproduction of information.

Here, the recording and reproducing head 88 is supported by a not illustrated actuator so as to be movable in the up-down direction (height direction), so as to be able to move in the recording tape T width direction (axial direction of the reel hubs 22, 82) following a servo signal S (see FIG. 8) provided to the recording tape T.

In the servo signal S, for example as shown in FIG. 8, four (or five or so) parallel bars P are arranged to form a set in a substantially V-shape, and plural sets of the substantially V-shaped servo signal S are disposed in a row in the vicinity of the upper and lower edge portions of the recording tape T, with their flared sides located at the outer side.

With such a servo signal S, if a detection time (distance) of the set of servo signal S (indicated by W in FIG. 8) becomes longer, it is apparent that the position of the running recording tape T is deviating either up or down with respect to the recording and reproducing head 88, and, the position of the reproducing head 88 may be adjusted accordingly in the up-down direction (height direction).

In the reel 20 and the take-up reel 80 of the present exemplary embodiment, both the radii of the outer peripheral faces of the reel hubs 22, 82 on the upper flange 24, 84 side are larger than those of the lower flange 26, 86 side, and a positive curvature recording tape T is wound on the reel hubs 22, 82. Therefore, as will be explained later, the recording tape T is appropriately deviated to the end portion on the lower flange 26, 86 side, and the running base is the lower flange 26, 86 side (the small diameter side) of the reel hubs 22, 82.

Displacement in the up-down direction (the axial direction of the reel 20 and the take-up reel 80) of the recording tape T may thereby be suitably suppressed, and the running position of the recording tape T may be stabilized. Therefore, by making the edge of the recording tape T on the lower flange 26, 86 side the running base using servo tracking control when the recording tape T is running, the generation of servo signal read errors (servo tracking errors) and of data signal (information) recording/reproducing errors, may be reduced.

The recording tape T on which recording or reproduction of information has been completed without error, by being in sliding contact with the recording and reproducing head 88 is then rewound on the reel 20 by reverse rotation of the drive gear and the take-up reel 80 while the height position (position in the width direction) of the tape T is regulated by the respective tape guides 72 to 78, by the shape of the reel hubs 22, 82 of the reel 20 and the take-up reel 80, and by the orientation of the curvature of the recording tape T.

When the recording tape T is rewound to the end on the reel 20 and the leader pin 30 is retained by the pin retaining portions 36, the bucket in which the recording tape cartridge 10 is housed moves up through a predetermined distance, the positioning member is withdrawn from the positioning hole portion, the drive gear is withdrawn from the gear opening 40, and the drive gear is disengaged from the reel gear 44. The reel 20 then moves down to the original height position.

The recording tape cartridge 10 is then moved in the opposite direction to the direction of the arrow A by a not illustrated eject mechanism, and along with this movement, the door 50 slides in the direction for closing the opening 18, due to the biasing force of the coil spring 58, completely closing the opening 18 (returning the door to the initial state). The recording tape cartridge 10 with closed opening 18 is completely ejected from the drive device 70 (bucket).

More detailed explanation will now be given of the operation and effect of the above reel 20 and take-up reel 80. Since the operation and effect of the take-up reel 80 is substantially the same as that of the operation and effect of the reel 20, explanation will be given of the reel 20, and explanation regarding the take-up reel 80 will be omitted as appropriate.

The reel 20 is assembled, as shown in FIGS. 3 and 4, with the upper circular cylinder portion 24A extending down from the upper flange 24 welded to the lower circular cylinder portion 26A extending up from the lower flange 26, and also with the reel hub 22 fitted over the outside of the upper circular cylinder portion 24A and the lower circular cylinder portion 26A. There is a predetermined gap formed between the inner peripheral face of the reel hub 22 and the outer peripheral faces of the upper circular cylinder portion 24A and the lower circular cylinder portion 26A, with a predetermined gap in the radial direction between the engaging grooves 22A and the ribs 23, which are used for preventing rotation and making the reel hub 22 non-relatively rotatable with respect to the upper flanges 24, 26 (prohibiting relative movement in the circumferential direction).

Therefore the reel hub 22 is not influenced by deformations in the upper and lower flanges 24, 26, or vice-versa. Namely, the reel hub 22 is in an independent state from the upper and lower flanges 24, 26, and even if, for example, the reel hub 22 is deformed by the winding tension F, the upper flange 24 or the lower flange 26 are not influenced by this deformation (see FIG. 9B).

The reel hub 22 of the reel 20 is formed from a metal, such as aluminum and stainless steel, or is a configuration with a synthetic resin (plastic) reel hub 22 with an aluminum or stainless steel metal ring insert formed or press fitted and integrated therewith. Namely, the Young's modulus (modulus of elasticity) of the reel hub 22 material is 70 GPa or greater (when aluminum is used), and is preferably 190 GPa or greater (when stainless steel is used).

Figure 16A:
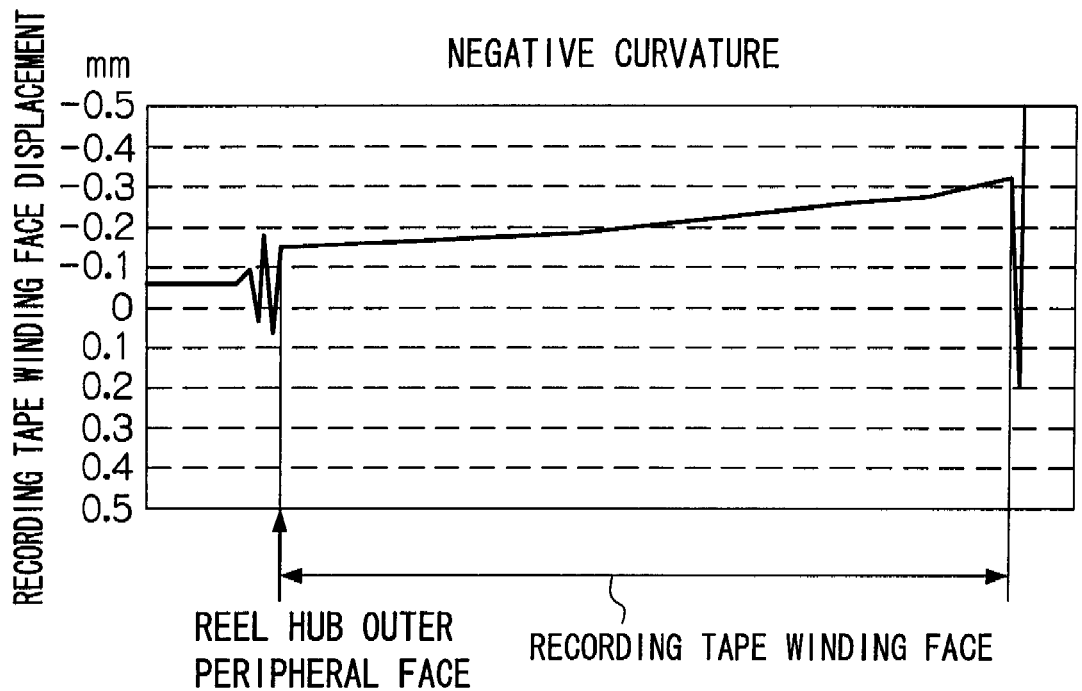
FIG. 16A is a winding form measurement chart for a negative curvature recording tape.
Figure 16B:
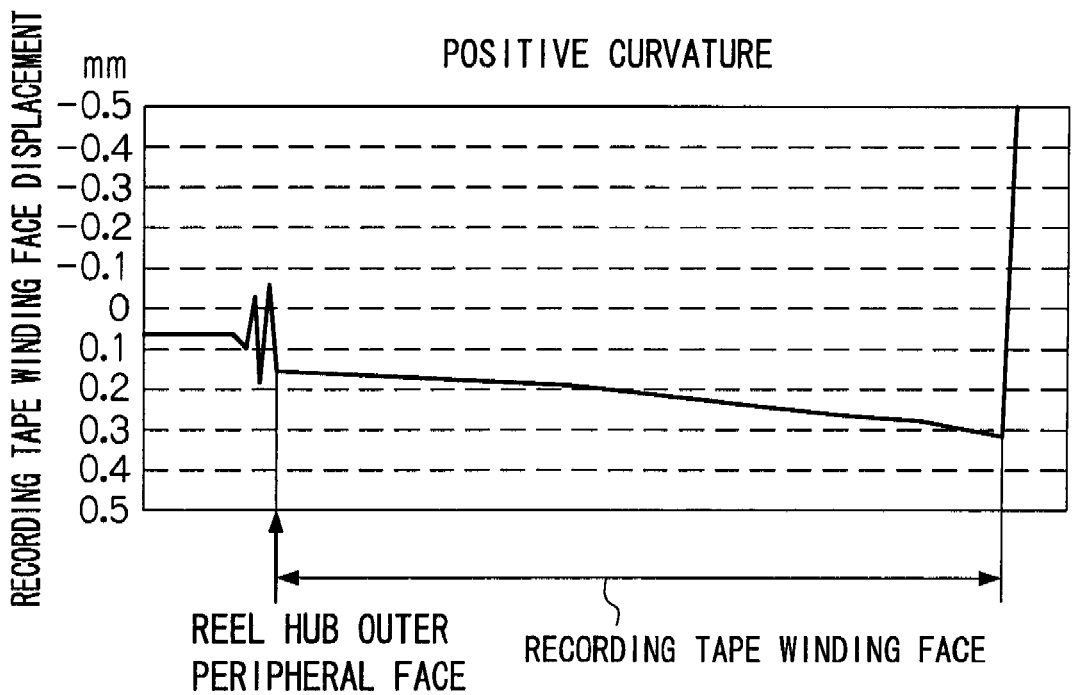
FIG. 16B is a winding form measurement chart for a positive curvature recording tape.

Generally, a recording tape T deviates toward the upper flange 24 side or toward the lower flange 26 side according to the polarity of the curvature thereof. FIGS. 16A and 16B show examples of winding form measurement charts for negative curvature and positive curvature recording tapes T that have each been wound on a conventional reel hub (not illustrated) with radii of the outer peripheral face at the upper flange 24 side and at the lower flange 26 side which are substantially equal to each other. It should be noted that intermediate variations of the winding surface have been omitted in the figures.

As shown in FIG. 16A, when the polarity of the direction of curvature of the recording tape T is negative (negative curvature), the recording tape T moves along the reel hub 22 axial direction toward the upper flange 24 side as winding progresses. When, as shown in FIG. 16B, the polarity of the direction of curvature of the recording tape T is positive (positive curvature), the recording tape T moves along the reel hub 22 axial direction toward the lower flange 26 side as winding progresses. The direction of movement of the recording tape T is thus different depending on the polarity of curvature thereof.

However, in the reel 20, radius of the outer peripheral face of the reel hub 22 at the upper flange 24 side is greater than the radius at the lower flange 26 side. Accordingly, when the recording tape T is wound with a tension applied substantially perpendicular to the reel hub 22 axial direction, the recording tape T is deviated toward the lower flange 26 side, the smaller diameter side, of the reel hub 22 due to the asymmetry in the surface pressure applied to the recording tape T.

Figure 9A:
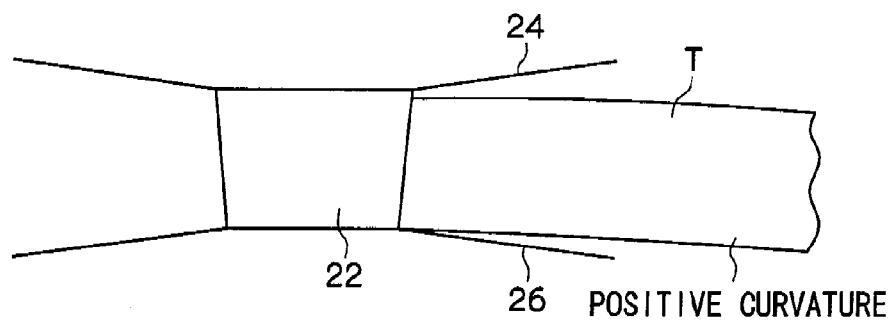
FIG. 9A is a schematic side view showing a winding state of a recording tape on a reel.
Figure 9B:
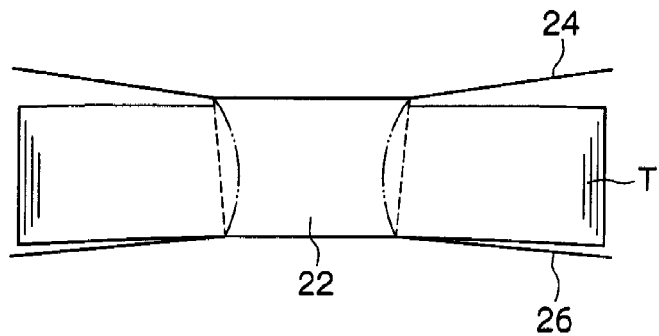
FIG. 9B is a schematic side view for explaining the operation of a reel.

Accordingly, as shown in FIGS. 9A and 9B, the recording tape T wound on the reel hub 22 is a recording tape T with a positive direction polarity (positive curvature). Namely, the recording tape T is wound on the reel hub 22 with the edge of the recording tape T with the smaller radius of curvature to the lower flange 26 side. The recording tape T may thereby be appropriately deviated toward the lower flange 26 side, and a good winding shape (winding form) may be achieved, with the lower flange 26 side (small diameter side) of the reel hub 22 as the running base of the recording tape T.

The winding of the recording tape T toward the small radius side of the reel hub 22, namely making the running base of the recording tape T the small radius side of the reel hub 22, and the good winding shape (winding form) when winding the recording tape T on the reel 20 configured in this manner will now be explained based on experimental data. It should be noted that for convenience when the radius of the reel hub 22 on the upper flange 24 side is greater than that on the lower flange 26 side, the radial difference ΔR is denoted with a positive value (+), and in the opposite case (when formed with the radius on the lower flange 26 side larger than on the upper flange 24 side) the radial difference ΔR is denoted with a negative value (−).

Figure 17:
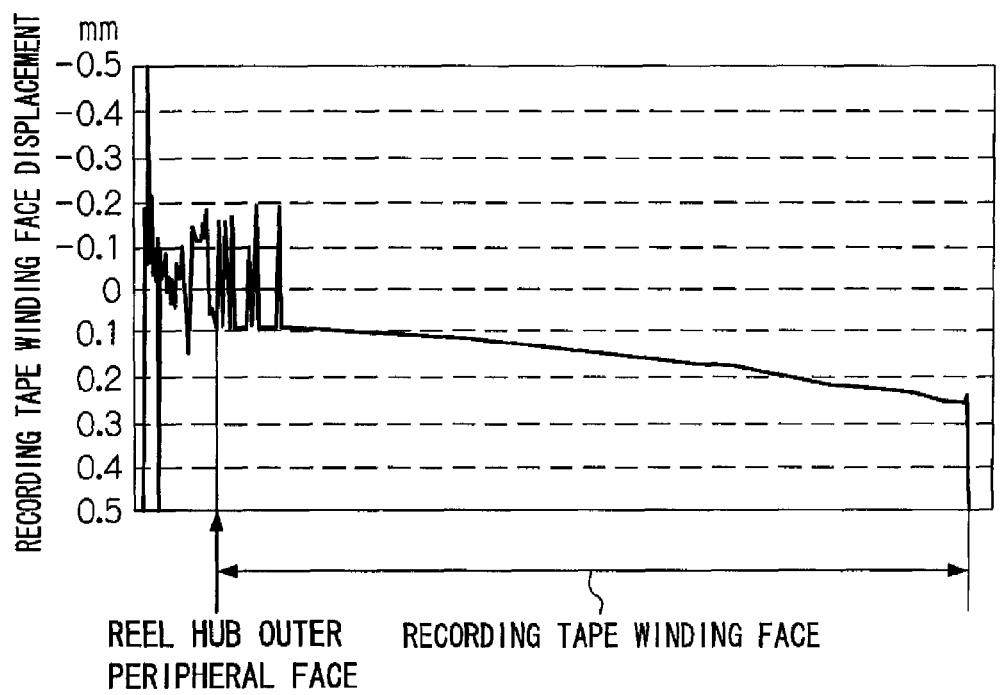
FIG. 17 is a winding form measurement chart when a positive curvature recording tape T has been wound on a reel with a reel hub made from polycarbonate (PC) with a radial difference of −0.003 mm.
Figure 18:
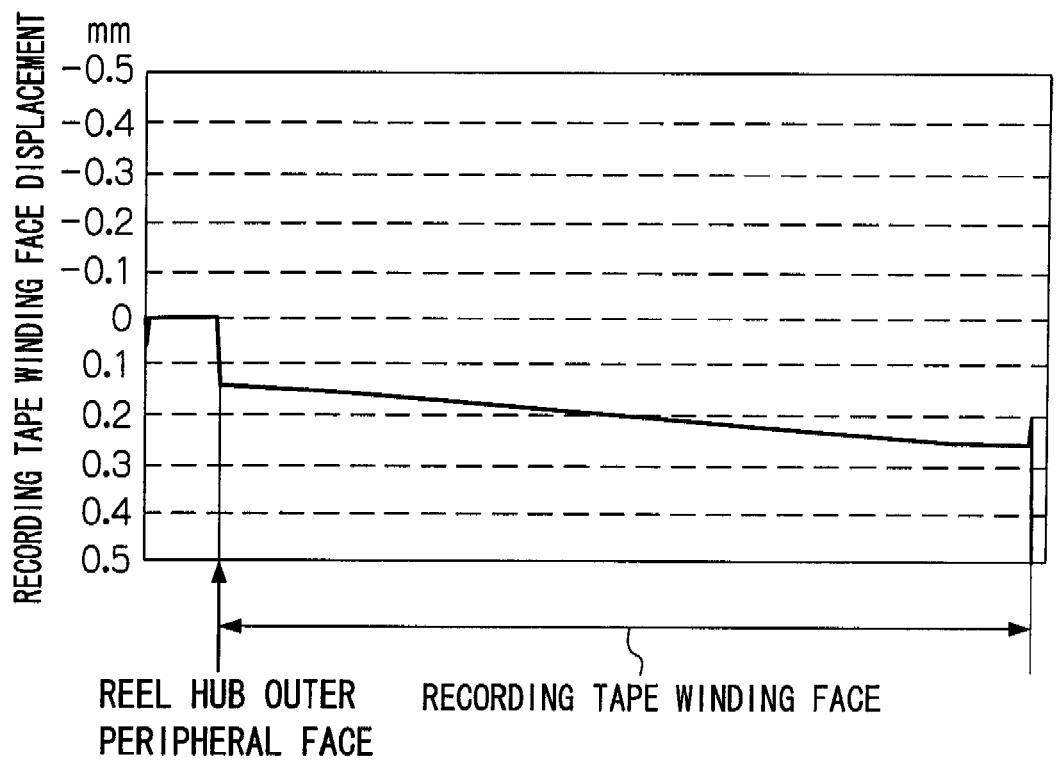
FIG. 18 is a winding form measurement chart when a positive curvature recording tape T has been wound on a reel with a reel hub made from aluminum with a radial difference of +0.040 mm.
Figure 19:
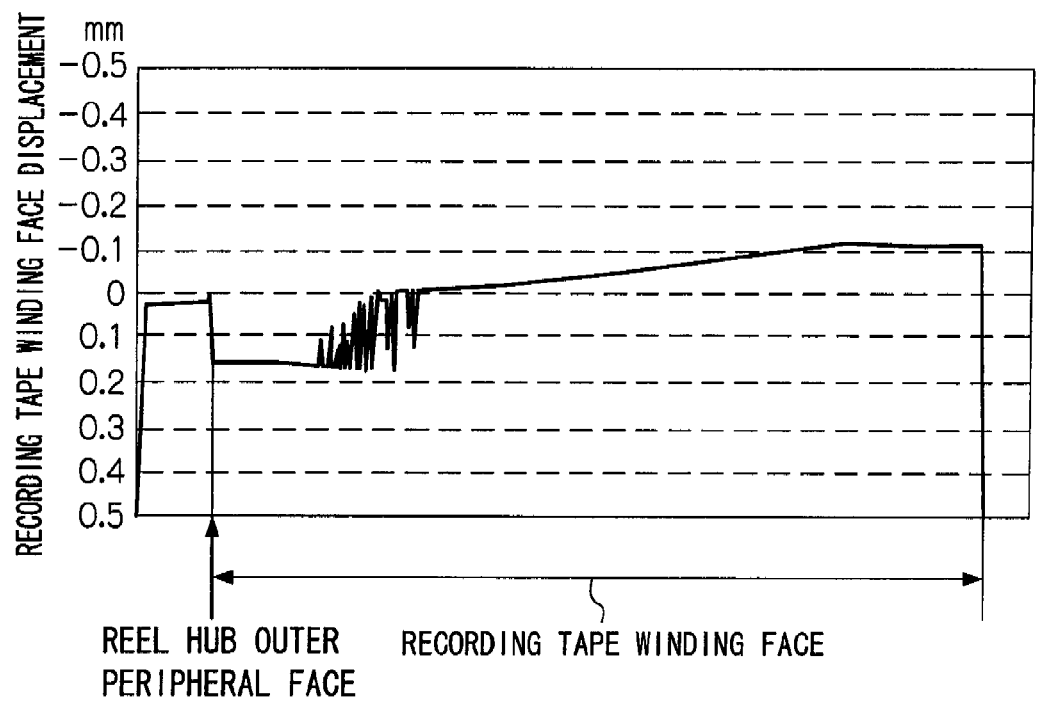
FIG. 19 is a winding form measurement chart when a positive curvature recording tape T has been wound on a reel with a reel hub made from aluminum with a radial difference of −0.040 mm.

FIGS. 17 to 19 show winding form measurement charts for positive curvature (curvature amount ΔD=+0.86 mm) recording tapes T wound onto the respective reels 20 with reel hubs 22 of differing materials. FIG. 17 is a winding form measurement chart for a reel (not illustrated) in which the material of the reel hub 22 is polycarbonate (PC: Young's modulus less than 70 GPa) with added glass fiber (GF) at 10%, and the radial difference ΔR of the reel hub 22 is ΔR=−0.003 mm (−3 μm) (the ΔR is close to ±0).

FIG. 18 is a winding form measurement chart for a reel 20 in which the material of the reel hub 22 is aluminum (Al: Young's modulus 70 GPa or greater), and the radial difference ΔR of the reel hub 22 is ΔR=+0.040 mm (+40 μm); FIG. 19 is a winding form measurement chart for a reel 20 in which the material of the reel hub 22 is aluminum (Al: Young's modulus 70 GPa or greater), and the radial difference ΔR of the reel hub 22 is ΔR=−0.040 mm (−40 μm).

From FIGS. 17 to 19, it is clear that the winding form measurement chart of FIG. 18 is extremely good. Namely, good winding shape (winding form) may be obtained by using an aluminum reel hub 22 (Al: Young's modulus 70 GPa or greater) with a radial difference ΔR=+0.040 mm (+40 μm), and winding thereon a recording tape T with a positive curvature ΔD=+0.86 mm.

Furthermore, Table 1 shows evaluations of "good/bad recording tape winding shape" and "good/bad tape edge" when the "radial difference ΔR of the reel hub 22 between the upper flange 24 side and the lower flange 26 side", that is the "ratio of the radial difference ΔR of the reel hub 22, between the upper flange 24 side and the lower flange 26 side, to the recording tape T width (½ inch width, about 12.65 mm)" is varied. It should be noted that in Table 1 the radius of the outer peripheral face of the upper flange 24 side is larger than the radius of the lower flange 26 side of the reel hub 22, thus the "+" sign has been omitted.

TABLE 1

| Example | Difference between radii on upper flange side and lower flange side of reel hub (mm) | Ratio of difference, between radii on upper flange side and lower flange side of reel hub, to tape width | Good/bad tape winding shape* | Good/bad tape edge* |
|---|---|---|---|---|
| 1 | 0.080 | 0.00632 | A | C to D |
| 2 | 0.060 | 0.00474 | A | B |
| 3 | 0.050 | 0.00400 | A | A |
| 4 | 0.040 | 0.00316 | A | A |

TABLE 1-continued

| Example | Difference between radii on upper flange side and lower flange side of reel hub (mm) | Ratio of difference, between radii on upper flange side and lower flange side of reel hub, to tape width | Good/bad tape winding shape* | Good/bad tape edge* |
|---|---|---|---|---|
| 5 | 0.020 | 0.00158 | B | A |
| 6 | 0.007 | 0.00055 | B | A |
| 7 | 0.005 | 0.00039 | B | A |
| 8 | 0.003 | 0.00237 | C | A |
| 9 | 0.000 | 0.00000 | C to D | A |

*A: Excellent, B: Good, C: Poor, D: Bad

It is apparent from Table 1 that the winding shape is not good when the radial difference ΔR, between the upper flange 24 side and the lower flange 26 side of the reel hub 22, is less than 0.005 mm (5 μm) (when the ratio of the radial difference ΔR, between the upper flange 24 side and the lower flange 26 side of the reel hub 22, to the recording tape T width is less than 0.00039). This may be considered to be because the effect of moving the winding recording tape T to the small radius side of the reel hub 22 is not obtained, or because the shape of the reel hub 22 cannot be correctly comprehended to the precision of the measurements.

Furthermore, when the radial difference ΔR, between the upper flange 24 side and the lower flange 26 side of the reel hub 22, is greater than 0.060 mm (60 μm) (when the ratio of the radial difference ΔR, between the upper flange 24 side and the lower flange 26 side of the reel hub 22, to the recording tape T width is greater than 0.00474) then the winding shape is good, but radial defects in the radial direction and tape edge damage may be seen, originating in the vicinity of the reel hub 22.

It is apparent, in other words, that if the radial difference ΔR, between the upper flange 24 side and the lower flange 26 side of the reel hub 22, is too large, the recording tape T presses too hard against the lower flange 26 side, damaging the tape edge, generating so-called radial defects, and the recording tape T is impeded by the lower flange 26 when running, causing further tape edge damage and other defects, such as a cinching phenomenon, may also be generated.

The reel 20 therefore has a radial difference ΔR, between the upper flange 24 side and the lower flange 26 side of the reel hub 22, set within a range of 5 μm to 60 μm for a recording tape T of width ½ inch (about 12.65 mm). Namely the ratio of the radial difference ΔR, between the upper flange 24 side and the lower flange 26 side of the reel hub 22, to the recording tape T width is in the range of from 0.00039 to 0.00474.

Furthermore, when the curvature amount ΔD of the recording tape T is too small (near to zero), the polarity (direction of movement with winding) is not defined, and the recording tape T displaces in the up-down direction, and disordered winding is readily generated, with the winding face taking up a so-called dished winding shape. If the curvature amount ΔD is too large for a positive curvature recording tape T, then the recording tape T is pressed too hard against the lower flange 26 side, damaging the tape edge, and so-called radial defects are generated, and the recording tape T is impeded when running by the lower flange 26, leading to further damage to the tape edge, and other defects, such as a cinching phenomenon, may also be generated, and the tape running position may be too far deviated to one side. It is therefore necessary to set an appropriate curvature amount ΔD. Table 2 shows recording tape T curvature amounts ΔD and conditions of the tape edge.

TABLE 2

| | Recording tape T curvature amount (mm) | Condition of the tape edge* |
|---|---|---|
| 1 | 0.10 | C |
| 2 | 0.15 | B |
| 3 | 0.20 | B |
| 4 | 0.50 | A |
| 5 | 1.00 | A |
| 6 | 1.50 | A |
| 7 | 2.00 | A |
| 8 | 2.50 | B |
| 9 | 3.00 | C |

*A: Excellent, B: Good, C: Poor, D: Bad

It is apparent from Table 2 that when the curvature amount ΔD is in the range of 0.15 mm to 2.5 mm, problems with the tape edge do not occur. Therefore, in this present exemplary embodiment, the absolute value of the recording tape T curvature amount ΔD=0.15 mm to 2.5 mm. Accordingly, correct and stable tape running position with little distorted winding may be achieved. Namely, distorted winding may be suppressed, and the winding surface is near to perfect winding.

It should be noted that the absolute value of the recording tape T curvature amount ΔD is preferably in the range of ΔD=0.5 mm to 2.0 mm so that, when winding the recording tape T on the reel hub 22, the tape edge is deviated by a suitable amount toward the lower flange 26 side. Namely, positional displacement of the recording tape T, in the reel hub 22 axial direction, when running is decreased, and distorted winding may be suppressed, and since the recording tape T may be wound in a neat condition along the lower flange 26 side, damage to the tape edge of the recording tape T may be reduced.

Therefore, when the recording tape T curvature amount ΔD is a small amount in the range 0.5 mm to 2.0 mm (when the radius of curvature of the tape edge of the recording tape T is large), with respect to the width of the recording tape T, a radial difference ΔR, between the upper flange 24 side and the lower flange 26 side of the reel hub 22, of 5 μm to 60 μm (a ratio of the radial difference ΔR, between the upper flange 24 side and the lower flange 26 side of the reel hub 22, to the width of the recording tape T of 0.00039 to 0.00474) functions sufficiently.

However, from the perspective of the manufacturability and the design freedom of the reel 20, there are also times when the recording tape T curvature amount ΔD is larger than 2.5 mm (there are also times when the radius of curvature of the tape edge curvature of the recording tape T is smaller). In such cases, the radial difference ΔR, between the upper flange 24 side and the lower flange 26 side of the reel hub 22, is preferably within the range from 7 μm to 50 μm (the ratio of the radial difference ΔR, between the upper flange 24 side and the lower flange 26 side of the reel hub 22, to the width of the recording tape T is within the range from 0.00055 to 0.00400).

Within these ranges, the recording tape T is not pressed to hard against the inner face of the lower flange 26 side of the reel hub 22, the lower flange 26 does not impede the recording tape T, and there is a suitable amount of deviation of the recording tape T toward the lower flange 26 side. Namely, the occurrence of running defects, such as damage to the tape edge and abnormal noise, may be suppressed, and good winding shape may be obtained even if the recording tape T curvature amount ΔD is 2.5 mm.

In the above explanation, the reel 20 according to the present exemplary embodiment is configured with the reel hub 22 and the upper and lower flanges 24, 26 that are not moved/influence by each other's deformation (they are independent of each other), and the radius of the reel hub 22 is larger on the upper flange 24 side than on the lower flange 26 side, and so the following effects (1) and (2) are shown.

(1) When the recording tape T is wound on the reel hub 22 while applied with tension in a direction substantially perpendicular to the axis of the reel hub 22, the recording tape T is wound while deviating toward the flange on the small-diameter side of the hub due to asymmetry of the distribution of the surface pressure acting on the recording tape.

(2) When the recording tape T is wound on the reel hub 22 in such a manner that the side having the smaller radius of curvature of the tape edge is on the small-diameter side of the reel hub 22, the direction of movement of the recording tape T is toward the small-diameter side of the reel hub 22, the lower flange 26 side.

In other words, according to the present exemplary embodiment, the recording tape T may be wound with appropriate deviation toward the side of the lower flange 26 on the small-diameter side of the reel hub 22 due to the synergy of (1) and (2). Therefore, displacement of the recording tape in the axial direction of the reel hub 22 may be suppressed, disordered winding of the recording tape T may be suppressed, and the winding neatness may be improved (good winding shape may be achieved).

As a result, occurrence of sticking out of one lap or plural laps of the recording tape T from the winding face of the tape wound on the reel hub 22 and occurrence of steps may be suppressed. Also problems caused by a drop impact when the sticking-out lap of the recording tape T collides with the upper flange 24 or lower flange 26 and is folded, and tape edge damage may be reduced.

Moreover, positional displacement of the recording tape T in the axial direction of the reel hub 82 may also be suppressed when the recording tape T is running in the drive device 70 and the tape running position may be stabilized. In particular, displacement of the recording tape T in the axial direction of the reel hub 82 of the take-up reel 80, which is difficult to improve in precision due to the complicated shape thereof necessary to provide the functionality to mount the leader block 85, may be suppressed on the reel 20 side. Therefore, servo signal read errors (servo-tracking errors) and data signal recording/reproducing errors may be reduced, even with high density recording, and a reduction in the occurrence of position error signals and off-track may be expected.

Furthermore, when the recording tape T is thick, the tape edges are increased in strength due to the increase in the rigidity of the recording tape T, and tape edge damage, such as due to pressing/impact/friction/abrasion against the upper and lower flanges 24, 26, does not readily occur. However, there is a tendency recently for the thickness of the recording tape T to be thinner, so that the recording capacity can be increased pre cartridge, and if the same tension is applied for a recording tape T of the same width, there is a change in the stress distribution applied across the width direction of the tape when it has been wound on the reel 20 (reel hub 22).

That is, with a reduction in the rigidity of the recording tape T being wound, and a reduction in the strength of the tape edges, folding over of the edge due to one ply sticking out and tape edge damage when running become more of a problem. In consideration of this, the reel 20 of the present exemplary embodiment is able to reduce both the amount by which one ply sticks out, and the frequency of such occurrences themselves, by suppressing positional displacement of the recording tape T. The present exemplary embodiment is therefore effective for thin recording tape T (of, for example, 6.9 μm or below).

The direction of curvature of the recording tape T may be changed by heat treatment. Namely, appropriate heat treatment may be carried out to the tapered shape outer peripheral face of the reel hub 22 of a reel (not illustrated) when the recording tape T has been wound thereon, and uniform curvature may be imparted to the recording tape T using a shape fixing effect due to a creep phenomenon, and a good winding curl applied thereto. A positive curvature recording tape T is used in the present exemplary embodiment, however, a negative curvature recording tape T may be used if the radius of the outer peripheral face of the reel hub 22 is made smaller on the upper flange 24 side to that on the lower flange 26 side. In such cases the running base of the recording tape T is the upper flange 24 side.

Figure 20:
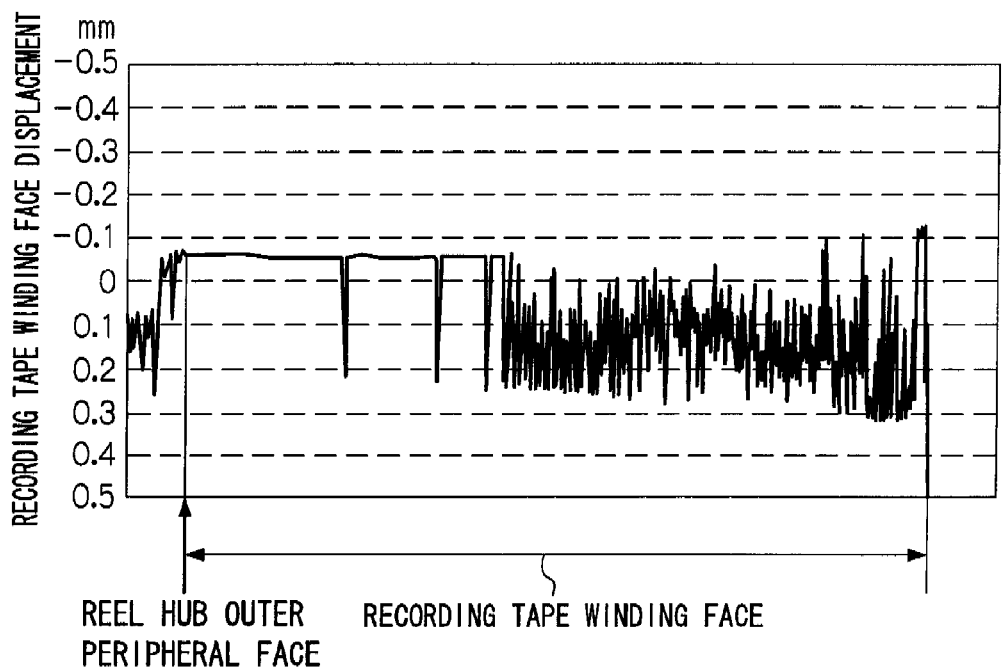
FIG. 20 is a winding form measurement chart when a negative curvature recording tape T has been wound on a reel with a reel hub made from polycarbonate (PC) with a radial difference of −0.003 mm.
Figure 21:
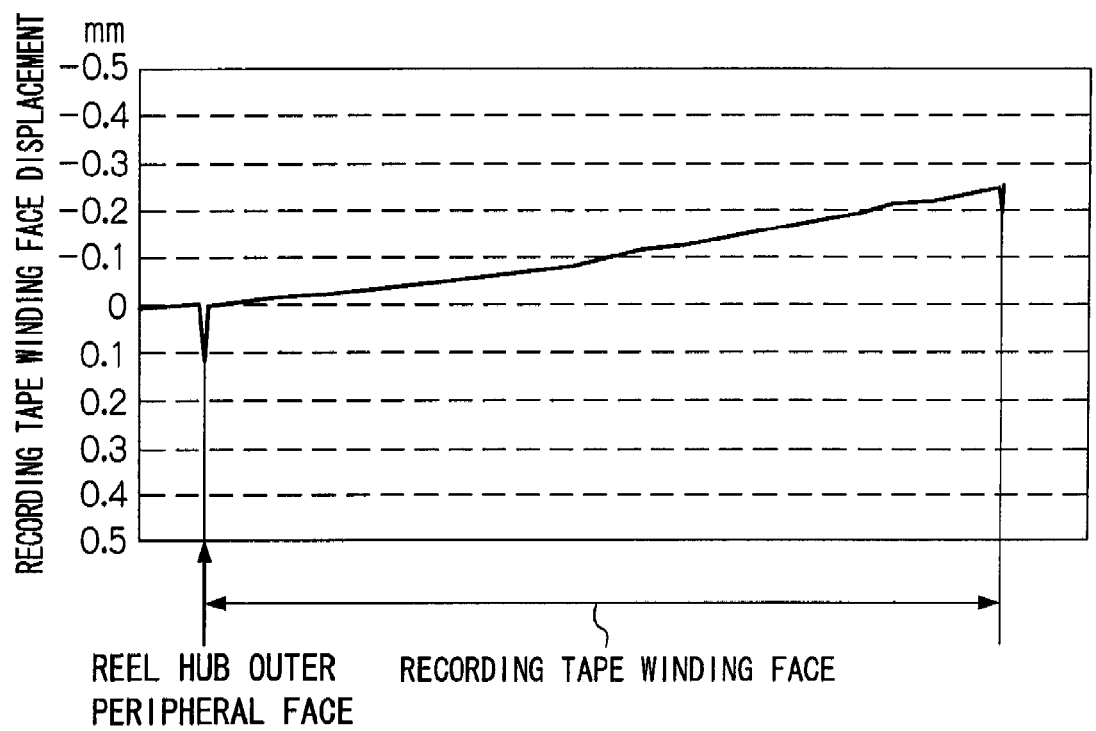
FIG. 21 is a winding form measurement chart when a negative curvature recording tape T has been wound on a reel with a reel hub made from aluminum with a radial difference of −0.040 mm.
Figure 22:
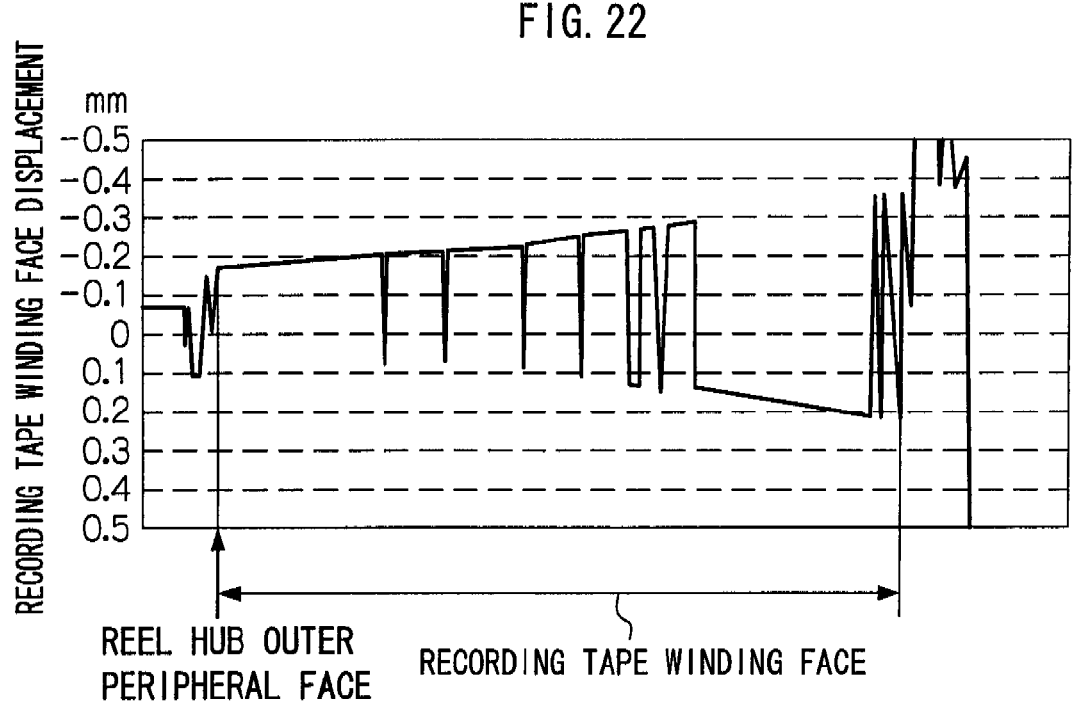
FIG. 22 is a winding form measurement chart when a negative curvature recording tape has been wound on a conventional reel.

FIGS. 20 and 21 shown winding form measurement charts for negative curvature recording tapes T (curvature amount ΔD=−0.15) which have each been wound on reels 20 with reel hubs 22 of different materials. The material of the reel hub 22 in FIG. 20 is polycarbonate (PC: Young's modulus less than 70 GPa) with added glass fiber (GF) at 10%, and the radial difference ΔR of the reel hub 22 is ΔR=−0.003 mm (−3 μm) (the ΔR is close to ±0).

FIG. 21 is a winding form measurement chart for a reel 20 in which the material of the reel hub 22 is aluminum (Al: Young's modulus 70 GPa or greater), and the radial difference ΔR of the reel hub 22 is ΔR=−0.040 mm. It is apparent from FIGS. 20 and 21 that when the material of the reel hub 22 is aluminum (Al: Young's modulus 70 GPa or greater), and the radial difference ΔR of the reel hub 22 is ΔR=−0.040 mm, there is good winding shape (winding form) for recording tape T with a negative curvature (curvature amount ΔD=−0.15).

In the present exemplary embodiment an example has been given of an application to a recording tape cartridge 10 configured with a single reel 20 accommodated in within the case 12, however, the invention is not limited thereto and the present invention may obviously also applied, for example, to a two-reel type recording tape cassette in which two reels are accommodated.

According to the present invention, as has been made clear in the above explanation, displacement may be suppressed in the hub axial direction when winding recording tape on a hub, and one lap sticking out and distorted winding may be suppressed. Therefore, the occurrence of folding over of one lap which is sticking out, and damage to tape edges, due to contact of the recording tape to the flanges from impact, such as from dropping, may be reduced, and the occurrence of read errors of servo signals and recording/reproducing errors of data signals may also be reduced.

What is claimed is:

1. A tape reel comprising:
   a substantially circular cylinder shaped hub for winding recording tape thereon;
   flanges, formed as separate bodies from the hub and provided at both end portions of the hub;
   a connecting member, provided to at least one of the flanges and connecting together the flanges at the inside of the hub, in a non-contact state with the inner peripheral face of the hub; wherein
   the radius of the outer peripheral face of the hub is different at one end from at the other end, and the recording tape is wound on the hub in such a manner that the side of the recording tape with the smaller radius of tape edge curvature is on the smaller diameter side of the hub, and
   wherein at least one of the flanges is formed with engaging portions, and the hub comprises engaged portions which are engaged by the engaging portions formed on the flange, such that the hub is not relatively rotatable with respect to the flange and such that there is a predetermined gap formed in the hub radial direction between the engaging portions and the engaged portions.

2. The tape reel of claim 1, wherein the modulus of elasticity of the hub is 70 GPa or greater.

3. The tape reel of claim 1, wherein the ratio of the radial difference between one end
   of the hub and the other to the width of the recording tape is from 0.0003 9 to 0.00474.

4. The tape reel of claim 1, wherein the width of the recording tape is approximately 12.65 mm and the difference between the radius at one end of the hub to at the other end of the hub is 5 μm to 6 μm.

5. The tape reel of claim 1, wherein the absolute value of an amount of curvature of the recording tape is 0.15 mm to 2.5 mm.

6. The tape reel of claim 1, wherein the thickness of the recording tape is 7.5 μm or less.

7. The tape reel of claim 1, wherein the recording tape for winding is recorded with a servo signal, which becomes a reference for positioning a recording and reproducing head on a drive device side, and for the recording tape wound on the hub, the tape edge on the smaller radius side of the outer peripheral face of the hub is the reference for servo tracking control when the recording tape is running.

8. A recording tape cartridge comprising the tape reel of claim 1, and a case in which the tape reel is rotatably housed.

9. The recording tape cartridge of claim 8, wherein a single reel of the tape reel is provided.

10. A take-up reel which is provided in a drive device and around which recording tape drawn out of a recording tape cartridge is wound, the take-up reel comprising:
    a substantially cylindrical shaped hub for winding recording tape thereon;
    flanges, formed as separate bodies from the hub and provided at both end portions of the hub;
    a connecting member, provided to at least one of the flanges and connecting together the flanges at the inside of the hub, in a non-contact state with the inner peripheral face of the hub;
    wherein the radius of the outer peripheral face of the hub is different at one end from at the other end, and the recording tape is wound on the hub in such a manner that the side of the recording tape with the smaller radius of tape edge curvature is on the smaller diameter side of the hub, and
    wherein at least one of the flanges is formed with engaging portions, and the hub comprises engaged portions which are engaged by the engaging portions formed on the flange, such that the hub is not relatively rotatable with respect to the flange and such that there is a predetermined gap formed in the hub radial direction between the engaging portions and the engaged portions.

11. The tape reel of claim 10, wherein the modulus of elasticity of the hub is 70 GPa or greater.

12. The tape reel of claim 10, wherein the ratio of the radial difference between one end of the hub and the other to the width of the recording tape is from 0.00039 to 0.00474.

13. The tape reel of claim 10, wherein the width of the recording tape is approximately 12.65 mm and the difference between the radius at one end of the hub to at the other end of the hub is 5 μm to 60 μm.

14. The tape reel of claim 10, wherein the absolute value of an amount of curvature of the recording tape is 0.15 mm to 2.5 mm.

15. The tape reel of claim 10, wherein the thickness of the recording tape is 7.5 μm or less.

16. The tape reel of claim 10, wherein the recording tape for winding is recorded with a servo signal, which becomes a reference for positioning a recording and reproducing head on a drive device side, and for the recording tape wound on the hub, the tape edge on the smaller radius side of the outer peripheral face of the hub is the reference for servo tracking control when the recording tape is running.

17. A drawing-out member for drawing recording tape out of a recording tape cartridge, housed in the hub of the take-up reel of claim 10, and comprising a winding face forming a part of the outer peripheral face of the hub, wherein the radius at one end of the winding face is different from the radius at the other end of the winding face, and the winding face and the outer peripheral face of the hub become substantially flush with each other when the drawing-out member is housed in the hub.

18. A drive device comprising the take-up reel of claim 10, around which recording tape drawn out of a recording tape cartridge housed in the drive device is wound.

19. The drive device of claim 18 and further comprising: a drawing-out member for drawing recording tape out of a recording tape cartridge, housed in the take up reel;
    said drawing out member comprising:
    a winding face forming a part of the outer peripheral face of the hub, where the radius at one end of the winding face is different from the radius at the other end of the winding face, and the winding face and the outer peripheral face of the hub become substantially flush with each other when the drawing out member is housed in the hub.

* * * * *